US012780411B2

(12) United States Patent
Collins et al.

(10) Patent No.: US 12,780,411 B2
(45) Date of Patent: *Nov. 3, 2026

(54) SYSTEM AND METHOD FOR DRONE TETHERING

(71) Applicant: AeroVironment, Inc., Arlington, VA (US)

(72) Inventors: Gaemus Collins, San Diego, CA (US); Allan Matthew, San Diego, CA (US); David Twining, San Diego, CA (US)

(73) Assignee: AeroVironment, Inc., Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/797,853

(22) Filed: Aug. 8, 2024

(65) Prior Publication Data

US 2024/0400225 A1 Dec. 5, 2024

Related U.S. Application Data

(63) Continuation of application No. 17/055,537, filed as application No. PCT/US2019/033792 on May 23, 2019, now Pat. No. 12,084,179.

(Continued)

(51) Int. Cl.
*B64C 39/02* (2023.01)
*B64D 47/08* (2006.01)

(Continued)

(52) U.S. Cl.
CPC .......... *B64C 39/022* (2013.01); *B64C 39/024* (2013.01); *B64D 47/08* (2013.01);

(Continued)

(58) Field of Classification Search
CPC ..... B64C 39/022; B64C 39/024; B64D 47/08; B64F 3/02; B64U 10/60; B64U 50/34;

(Continued)

(56) References Cited

U.S. PATENT DOCUMENTS

| | | | |
|---|---|---|---|
| 5,235,513 | A | 8/1993 | Velger et al. |
| 5,457,639 | A | 10/1995 | Ulich et al. |

(Continued)

FOREIGN PATENT DOCUMENTS

| | | | |
|---|---|---|---|
| CN | 103868521 | A | 6/2014 |
| CN | 206485525 | U | 9/2017 |

(Continued)

OTHER PUBLICATIONS

EP16812080.6 European Office Action dated Mar. 10, 2020.

(Continued)

*Primary Examiner* — Aniss Chad
*Assistant Examiner* — Christine Nguyen Huynh
(74) *Attorney, Agent, or Firm* — Command IP LLP; Michael Zarrabian; Eric Aagaard

(57) ABSTRACT

Disclosed herein are system and method for controlling an unmanned aerial vehicle (UAV) tethered from a mobile platform, the UAV system comprising: a UAV comprising one or more sensors, and one or more propellers; a tether attached to the UAV and to the mobile platform; a digital processing device comprising an operating system configured to perform executable instructions and a memory; and a computer program including instructions executable by the digital processing device to automatically control the UAV relative to the mobile platform comprising: a software module identifying the mobile platform; a software module estimating a real-time state of the mobile platform; and a software module automatically controlling three-dimensional real-time motion of the UAV based on the real-time state estimation of the mobile platform and data collected from the one or more sensors, such that the UAV is maintained at a predetermined position relative to the mobile platform.

20 Claims, 22 Drawing Sheets

Related U.S. Application Data

(60) Provisional application No. 62/675,643, filed on May 23, 2018.

(51) Int. Cl.

| | |
|---|---|
| ***B64F 3/02*** | (2006.01) |
| ***B64U 10/13*** | (2023.01) |
| ***B64U 10/60*** | (2023.01) |
| ***B64U 30/20*** | (2023.01) |
| ***B64U 50/34*** | (2023.01) |
| ***B64U 70/93*** | (2023.01) |
| ***B64U 101/30*** | (2023.01) |
| ***B64U 101/31*** | (2023.01) |
| ***G01L 5/04*** | (2006.01) |
| ***G05D 1/00*** | (2024.01) |
| ***G05D 1/46*** | (2024.01) |
| ***H04W 4/40*** | (2018.01) |

(52) U.S. Cl.
CPC ................ *B64F 3/02* (2013.01); *B64U 10/60* (2023.01); *B64U 50/34* (2023.01); *B64U 70/93* (2023.01); *G01L 5/04* (2013.01); *G05D 1/101* (2013.01); *G05D 1/46* (2024.01); *H04W 4/40* (2018.02); *B64U 10/13* (2023.01); *B64U 30/20* (2023.01); *B64U 2101/30* (2023.01); *B64U 2101/31* (2023.01); *B64U 2201/20* (2023.01); *B64U 2201/202* (2023.01)

(58) Field of Classification Search
CPC ........ B64U 70/93; B64U 10/13; B64U 30/20; B64U 2101/30; B64U 2101/31; B64U 2201/20; B64U 2201/202; B64U 2201/10; G01L 5/04; G05D 1/101; G05D 1/46; G05D 1/0684; G05D 1/0866; H04W 4/40
See application file for complete search history.

(56) References Cited

U.S. PATENT DOCUMENTS

| | | | |
|---|---|---|---|
| 5,906,336 | A | 5/1999 | Eckstein |
| 6,064,924 | A | 5/2000 | Fleischmann |
| 6,868,314 | B1 | 3/2005 | Frink |
| 8,148,992 | B2 | 4/2012 | Kowalczyk et al. |
| 9,056,676 | B1 | 6/2015 | Wang |
| 9,139,310 | B1 | 9/2015 | Wang |
| 9,524,648 | B1 | 12/2016 | Gopalakrishnan et al. |
| 9,675,419 | B2 | 6/2017 | Akeel et al. |
| 9,896,203 | B1 | 2/2018 | Kim et al. |
| 10,023,326 | B2 | 7/2018 | Byers et al. |
| 10,053,217 | B2 | 8/2018 | Cho et al. |
| 10,209,707 | B2 | 2/2019 | Matuszeski et al. |
| 10,322,820 | B2 | 6/2019 | Husain et al. |
| 10,370,102 | B2 | 8/2019 | Boykin et al. |
| 10,373,097 | B2 | 8/2019 | Kulkarni et al. |
| 10,434,885 | B2 | 10/2019 | Antonini et al. |
| 10,553,122 | B1 | 2/2020 | Gilboa-Amir et al. |
| 10,604,020 | B2 | 3/2020 | Ricci |
| 10,701,913 | B2 | 7/2020 | Twining et al. |
| 10,705,541 | B2 | 7/2020 | Twining et al. |
| 11,174,021 | B2 * | 11/2021 | Anderson ............... B60L 58/12 |
| 2006/0058928 | A1 | 3/2006 | Beard et al. |
| 2008/0207067 | A1 | 8/2008 | Ricciuti et al. |
| 2008/0260467 | A1 | 10/2008 | Kroecker et al. |
| 2011/0049288 | A1 | 3/2011 | Suzuki |
| 2011/0049290 | A1 | 3/2011 | Seydoux et al. |
| 2011/0068224 | A1 | 3/2011 | Kang et al. |
| 2011/0202209 | A1 | 8/2011 | Moresve |
| 2011/0264314 | A1 | 10/2011 | Parras |
| 2011/0307126 | A1 | 12/2011 | Hogstrom |
| 2012/0076397 | A1 | 3/2012 | Moresve |
| 2012/0271461 | A1 | 10/2012 | Spata |
| 2013/0054054 | A1 | 2/2013 | Tollenaere et al. |
| 2013/0120166 | A1 | 5/2013 | Kommuri et al. |
| 2014/0111332 | A1 | 4/2014 | Przybylko et al. |
| 2014/0124621 | A1 | 5/2014 | Godzdanker et al. |
| 2014/0152792 | A1 | 6/2014 | Krueger |
| 2014/0222246 | A1 | 8/2014 | Mohamadi |
| 2014/0236390 | A1 | 8/2014 | Mohamadi |
| 2014/0324253 | A1 | 10/2014 | Duggan et al. |
| 2014/0350754 | A1 | 11/2014 | Elgersma et al. |
| 2014/0379173 | A1 | 12/2014 | Knapp et al. |
| 2015/0025797 | A1 | 1/2015 | Hardesty et al. |
| 2015/0183498 | A1 | 7/2015 | Wardle |
| 2015/0207964 | A1 | 7/2015 | Bye et al. |
| 2015/0253126 | A1 | 9/2015 | Palandro et al. |
| 2015/0262492 | A1 | 9/2015 | Barnes et al. |
| 2015/0277442 | A1 | 10/2015 | Ballou |
| 2015/0298654 | A1 | 10/2015 | Joao et al. |
| 2015/0304813 | A1 | 10/2015 | Esposito et al. |
| 2015/0336669 | A1 | 11/2015 | Kantor et al. |
| 2015/0353206 | A1 | 12/2015 | Wang |
| 2015/0370250 | A1 | 12/2015 | Bachrach et al. |
| 2015/0370251 | A1 | 12/2015 | Siegel et al. |
| 2016/0018224 | A1 | 1/2016 | Isler et al. |
| 2016/0068264 | A1 | 3/2016 | Ganesh et al. |
| 2016/0082460 | A1 * | 3/2016 | McMaster ............. B05B 12/122 239/722 |
| 2016/0122038 | A1 | 5/2016 | Fleischman et al. |
| 2016/0124431 | A1 | 5/2016 | Kelso et al. |
| 2016/0144734 | A1 | 5/2016 | Wang et al. |
| 2016/0144958 | A1 | 5/2016 | Woodworth et al. |
| 2016/0284222 | A1 | 9/2016 | Nicholls et al. |
| 2016/0306824 | A1 | 10/2016 | Lopez et al. |
| 2016/0340006 | A1 | 11/2016 | Tang |
| 2016/0364989 | A1 | 12/2016 | Speasl et al. |
| 2016/0376000 | A1 | 12/2016 | Kohstall |
| 2017/0069214 | A1 | 3/2017 | Dupray et al. |
| 2017/0129603 | A1 | 5/2017 | Raptopoulos et al. |
| 2017/0137118 | A1 | 5/2017 | Gentry |
| 2017/0139424 | A1 | 5/2017 | Li |
| 2017/0144776 | A1 | 5/2017 | Fisher et al. |
| 2017/0197718 | A1 | 7/2017 | Buchmueller |
| 2017/0240277 | A1 * | 8/2017 | Molnar ............... G05D 1/0866 |
| 2017/0267374 | A1 | 9/2017 | Derenick et al. |
| 2017/0301109 | A1 | 10/2017 | Chan et al. |
| 2018/0033315 | A1 | 2/2018 | Winkle |
| 2018/0037322 | A1 | 2/2018 | Buchmueller et al. |
| 2018/0072419 | A1 | 3/2018 | Burgess et al. |
| 2018/0101173 | A1 | 4/2018 | Banerjee et al. |
| 2018/0186433 | A1 | 7/2018 | Gharabegian |
| 2018/0217256 | A1 | 8/2018 | Stokes |
| 2018/0284815 | A1 | 10/2018 | Cui et al. |
| 2018/0321680 | A1 | 11/2018 | Tu |
| 2018/0364740 | A1 | 12/2018 | Collins et al. |
| 2019/0128711 | A1 | 5/2019 | Connor et al. |
| 2019/0202530 | A1 | 7/2019 | Rikoski |
| 2019/0266712 | A1 | 8/2019 | Chirayath |
| 2020/0011995 | A1 | 1/2020 | Send et al. |
| 2020/0264171 | A1 | 8/2020 | Jain et al. |

FOREIGN PATENT DOCUMENTS

| | | | |
|---|---|---|---|
| EP | 3274256 | A2 | 1/2018 |
| EP | 3784569 | A1 | 3/2021 |
| KR | 20130009893 | A | 1/2013 |
| KR | 101236195 | B1 | 2/2013 |
| TW | 201445470 | A | 12/2014 |
| WO | 2006132713 | A2 | 12/2006 |
| WO | 2010071502 | A1 | 6/2010 |
| WO | 2013100849 | A1 | 7/2013 |
| WO | 2013171735 | A1 | 11/2013 |
| WO | 2014016240 | A1 | 1/2014 |
| WO | 2015012935 | A2 | 1/2015 |
| WO | 2015154148 | A1 | 10/2015 |
| WO | 2015179797 | A1 | 11/2015 |
| WO | 2016022347 | A1 | 2/2016 |
| WO | 2016204843 | A2 | 12/2016 |
| WO | 2017027836 | A1 | 2/2017 |
| WO | 2017123768 | A1 | 7/2017 |

(56) References Cited

FOREIGN PATENT DOCUMENTS

| | | | |
|---|---|---|---|
| WO | 2019226917 | A1 | 11/2019 |
| WO | 2020209915 | A2 | 10/2020 |

OTHER PUBLICATIONS

EP16812080.6 Extended Search Report dated Sep. 28, 2018.
European Application No. 17738939.2 Search Report dated Jul. 31, 2019.
Gautam et al. A survey of autonomous landing techniques for UAVS. International Conference On Unmanned Aircraft Systems (ICUAS), IEEE . Orlando, FL. (pp. 1210-1218) (2014).
Israeli Patent Application No. 254693 Office Action dated Sep. 12, 2020.
PCT/US20161024347 International Preliminary Report on Patentability dated Oct. 12, 2017.
PCT/US20161024347 International Search Report and Written Opinion dated Jan. 10, 2017.
PCT/US20171013203 International Preliminary Report on Patentability dated Jul. 17, 2018.
PCT/US20171013203 International Search Report and Written Opinion dated Apr. 25, 2017.
PCT/US20181038330 International Preliminary Report on Patentability dated Dec. 24, 2019.
PCT/US20181038330 International Search Report and Written Opinion dated Sep. 18, 2018.
PCT/US20191033792 International Preliminary Report on Patentability dated Nov. 24, 2020.
PCT/US20191033792 International Search Report and Written Opinion dated Aug. 28, 2019.
PCT/US20201013494 International Search Report and Written Opinion dated Oct. 8, 2020.
Taiwanese Patent Application No. 105109691 Office Action dated Feb. 21, 2020 (with English Translation).
U.S. Appl. No. 15/561,400 Final Action dated Jan. 7, 2019.
U.S. Appl. No. 15/561,400 Final Office Action dated Aug. 8, 2019.
U.S. Appl. No. 16/012,498 Final Office Action dated Aug. 24, 2020.
U.S. Appl. No. 16/012,498 Office Action dated Apr. 7, 2020.
U.S. Appl. No. 16/012,498 Office Action dated Dec. 11, 2020.
U.S. Appl. No. 16/069,861 Office Action dated Oct. 1, 2019.
Yoo et al. Sea wave modeling and shipboard landing simulation of tilt rotor unmanned aerial vehicle. 2013 13th International Conference On Control, Automation And Systems (ICCAS 2013), IEEE. Kimdaejung Convention Center, Gwangju, Korea. (pp. 1854-1859) (2013).

* cited by examiner

SYSTEM AND METHOD FOR DRONE TETHERING

CROSS-REFERENCE TO RELATED APPLICATION

This application is a continuation of U.S. Non-Provisional patent application Ser. No. 17/055,537, filed Nov. 13, 2020, which is a 35 U.S.C. § 371 National Stage Entry of International Application No. PCT/US2019/033792 filed May 23, 2019, which claims the benefit of U.S. Provisional Patent Application No. 62/675,643, filed May 23, 2018, all of which are incorporated herein by reference in their entirety for all purposes.

BACKGROUND

Robots are machines that are typically programmable by a computer and are capable of carrying out a complex series of actions. Unmanned aerial vehicles (UAVs) are certain types of robotic devices that can be used for performing surveillance, reconnaissance, and exploration tasks for military and civilian applications among other applications.

SUMMARY

Small unmanned aerial vehicle (UAV) are an effective tool for many applications, but are limited by a relatively short flight time, limited payload capacity, and significant RF signature. It is possible to eliminate the need to exchange or recharge batteries onboard the UAVs by providing power over a wire that is connected on one end to a power source and one the other end to a UAV. This wire can be referred to as a tether. The tether can provide both power and data between the drone and the ground. A tethered vertical takeoff and landing (VTOL) UAV may provide long endurance, increased payload, and small RF signature. While tethered systems limit the range of the UAV, the benefits outweigh the limitations in many missions, especially when operating from mobile platforms that may not be able to accommodate extensive installed hardware. A tether can affect the flight characteristics of the UAVs and in practice are difficult to work with. For example, as a tether unspools, the drone is required to lift a variable mass (longer tether deployed means more mass). Furthermore, the tether may cause tension, essentially yanking on the drone. Tether management is crucial for a system to be successfully deployed. This problem exists when the ground portion of the system (where the tether is attached) is stationary. However, the problem is compounded if the ground portion is moving. For example, a tethered drone operating from a boat need to deal with both the motion of the drone and the motion of the boat. Standard GNSS solutions alone, such as “follow me” mode, is not sufficient to provide the precision required. RF transmitters are unable to provide the precision needed in a tethered UAV system with a mobile platform.

Tethering technology has recently gained traction in support of long-duration UAS missions. Application of tethering in UAS systems may have several advantages over free-flight UAS, including extremely long flight times, a high-bandwidth communication link (over the tether), and no RF emissions. However, tethered UAS systems may face significant challenges related to mobility, since tethered UAS may be deployed in stationary locations, such that the tethered UAS are “stuck” hovering above a stationary point on the ground. The present disclosure provides technologies that have enabled tethered UAS operations to combine the advantages of long endurance and flexibility mobility toward deployment in a variety of mobile applications. First, present disclosure provides an optically guided precision UAS navigation system, which may enable a tethered UAS to precisely launch, “station-keep”, and land relative to a moving vehicle or moving vessel, with up to centimeter-level accuracy. Second, the present disclosure provides an automatic Launch and Recovery System (LARS)—an actuated launch and landing pad that releases the UAS immediately before takeoff, captures the UAS immediately after landing, and secures the UAS to a vehicle or vessel while it is not in flight. Third, the present disclosure provides a tether break-away system, which may enable a tethered UAS to optionally release its tether cable and transition to battery-powered free flight. These technologies may be configured to enable a variety of mobile UAS operations, including ISR convoy support, border security, communication relay, offshore asset inspection, and GPS-denied flight operations.

Disclosed herein in some embodiments are a low size, weight, power, and cost (SWAP-C) system and method that provide precision relative station keeping for tethered VTOL UAV operating from mobile platforms. The system and method disclosed herein make tether management from a mobile platform feasible by enabling precise navigation and control of the UAV relative to a mobile platform. In the simplest scenario, a tethered drone may hover at a fixed location directly above the mobile platform. As long as the drone and the mobile platform move in unison, there may not be any unexpected tension on the tether which would create an impulse on the drone.

The system and method disclosed herein for tether management in certain embodiments ensures that the UAV flies at a precisely known position relative to a mobile platform. In some cases, flight can include hovering at a fixed position relative to a mobile platform. For example, the system and method herein may allow the drone to hover precisely at a fixed offset from the mobile platform, for purposes of tether management. For example, if the tether is attached to the front of the drone, then it might make sense to offset behind the mobile platform by a few meters. Alternatively, drone may be not hovering but ascending, descending, moving forward or backward, moving left or right, pitching, rolling, or yawing. Precise relative navigation between the drone and mobile platform means that the tether can be properly accounted for during flight and not negatively interfere with the drone.

In an aspect, provided herein is an unmanned aerial vehicle (UAV) system, the UAV system comprising: a UAV comprising: a sensor configured to measure a sensor data; a UAV propeller; a mobile platform comprising a platform propeller; a tether attached to the UAV and to the mobile platform and a digital processing device comprising: at least one processor, an operating system configured to perform executable instructions, a memory, and a computer program including instructions executable by the digital processing device to create a tethered application comprising: a transmission module receiving the sensor data from the sensor at a selected rate; a locational module estimating a relative three-dimensional position of the UAV to the mobile platform, based on the sensor data; and a navigation module directing at least one of the UAV propeller and the platform propeller based on the relative three-dimensional position, to adjust the relative three-dimensional position within a set value.

In some embodiments, the tethered landing application is repeatedly executed for a plurality of times. In some embodiments, the mobile platform comprises a boat, truck, car, van, sled, person, ship, aircraft, submarine, bicycle, motorcycle, crane, tractor, wind turbine, or a combination thereof.

In some embodiments, the UAV is configurable for a payload capacity of about 1 kg to about 10 kg. In some embodiments, the UAV is configurable for a payload capacity of at least about 1 kg. In some embodiments, the UAV is configurable for a payload capacity of at most about 10 kg. In some embodiments, the UAV is configurable for a payload capacity of about 1 kg to about 2 kg, about 1 kg to about 3 kg, about 1 kg to about 4 kg, about 1 kg to about 5 kg, about 1 kg to about 6 kg, about 1 kg to about 7 kg, about 1 kg to about 8 kg, about 1 kg to about 9 kg, about 1 kg to about 10 kg, about 2 kg to about 3 kg, about 2 kg to about 4 kg, about 2 kg to about 5 kg, about 2 kg to about 6 kg, about 2 kg to about 7 kg, about 2 kg to about 8 kg, about 2 kg to about 9 kg, about 2 kg to about 10 kg, about 3 kg to about 4 kg, about 3 kg to about 5 kg, about 3 kg to about 6 kg, about 3 kg to about 7 kg, about 3 kg to about 8 kg, about 3 kg to about 9 kg, about 3 kg to about 10 kg, about 4 kg to about 5 kg, about 4 kg to about 6 kg, about 4 kg to about 7 kg, about 4 kg to about 8 kg, about 4 kg to about 9 kg, about 4 kg to about 10 kg, about 5 kg to about 6 kg, about 5 kg to about 7 kg, about 5 kg to about 8 kg, about 5 kg to about 9 kg, about 5 kg to about 10 kg, about 6 kg to about 7 kg, about 6 kg to about 8 kg, about 6 kg to about 9 kg, about 6 kg to about 10 kg, about 7 kg to about 8 kg, about 7 kg to about 9 kg, about 7 kg to about 10 kg, about 8 kg to about 9 kg, about 8 kg to about 10 kg, or about 9 kg to about 10 kg. In some embodiments, the UAV is configurable for a payload capacity of about 1 kg, about 2 kg, about 3 kg, about 4 kg, about 5 kg, about 6 kg, about 7 kg, about 8 kg, about 9 kg, or about 10 kg.

In some embodiments, the mobile platform is configured to move at a platform speed of about 1 mph to about 25 mph. In some embodiments, the mobile platform is configured to move at a platform speed of at least about 1 mph. In some embodiments, the mobile platform is configured to move at a platform speed of at most about 25 mph. In some embodiments, the mobile platform is configured to move at a platform speed of about 1 mph to about 2 mph, about 1 mph to about 5 mph, about 1 mph to about 10 mph, about 1 mph to about 15 mph, about 1 mph to about 20 mph, about 1 mph to about 25 mph, about 2 mph to about 5 mph, about 2 mph to about 10 mph, about 2 mph to about 15 mph, about 2 mph to about 20 mph, about 2 mph to about 25 mph, about 5 mph to about 10 mph, about 5 mph to about 15 mph, about 5 mph to about 20 mph, about 5 mph to about 25 mph, about 10 mph to about 15 mph, about 10 mph to about 20 mph, about 10 mph to about 25 mph, about 15 mph to about 20 mph, about 15 mph to about 25 mph, or about 20 mph to about 25 mph. In some embodiments, the mobile platform is configured to move at a platform speed of about 1 mph, about 2 mph, about 5 mph, about 10 mph, about 15 mph, about 20 mph, or about 25 mph.

In some embodiments, the tethered UAS system is configured to operate in wind conditions of about 0 knots (e.g., calm winds) to about 20 knots. In some embodiments, the tethered UAS system is configured to operate in wind conditions of about 1 knot, about 2 knots, about 3 knots, about 4 knots, about 5 knots, about 6 knots, about 7 knots, about 8 knots, about 9 knots, about 10 knots, about 11 knot, about 12 knots, about 13 knots, about 14 knots, about 15 knots, about 16 knots, about 17 knots, about 18 knots, about 19 knots, about 20 knots, or more than about 20 knots.

In some embodiments, the tethered UAS system is configured to operate in sea conditions of about 0 feet of heave (e.g., calm waters) to about 10 feet of heave. In some embodiments, the tethered UAS system is configured to operate in sea conditions of about 1 foot, about 2 feet, about 3 feet, about 4 feet, about 5 feet, about 6 feet, about 7 feet, about 8 feet, about 9 feet, about 10 feet, or more than about 10 feet of heave.

In some embodiments, the UAV is configured to operate at an altitude of about 1 meter, about 2 meters, about 3 meters, about 4 meters, about 5 meters, about 6 meters, about 7 meters, about 8 meters, about 9 meters, about 10 meters, about 15 meters, about 20 meters, about 25 meters, about 30 meters, about 35 meters, about 40 meters, about 45 meters, about 50 meters, about 55 meters, about 60 meters, about 65 meters, about 70 meters, about 75 meters, about 80 meters, about 85 meters, about 90 meters, about 95 meters, about 100 meters, or more than about 100 meters above the ground.

In some embodiments, the UAV is configured to move at a UAV speed of about 1 mph to about 80 mph. In some embodiments, the UAV is configured to move at a UAV speed of at least about 1 mph. In some embodiments, the UAV is configured to move at a UAV speed of at most about 80 mph. In some embodiments, the UAV is configured to move at a UAV speed of about 1 mph to about 5 mph, about 1 mph to about 10 mph, about 1 mph to about 20 mph, about 1 mph to about 30 mph, about 1 mph to about 40 mph, about 1 mph to about 50 mph, about 1 mph to about 60 mph, about 1 mph to about 70 mph, about 1 mph to about 80 mph, about 5 mph to about 10 mph, about 5 mph to about 20 mph, about 5 mph to about 30 mph, about 5 mph to about 40 mph, about 5 mph to about 50 mph, about 5 mph to about 60 mph, about 5 mph to about 70 mph, about 5 mph to about 80 mph, about 10 mph to about 20 mph, about 10 mph to about 30 mph, about 10 mph to about 40 mph, about 10 mph to about 50 mph, about 10 mph to about 60 mph, about 10 mph to about 70 mph, about 10 mph to about 80 mph, about 20 mph to about 30 mph, about 20 mph to about 40 mph, about 20 mph to about 50 mph, about 20 mph to about 60 mph, about 20 mph to about 70 mph, about 20 mph to about 80 mph, about 30 mph to about 40 mph, about 30 mph to about 50 mph, about 30 mph to about 60 mph, about 30 mph to about 70 mph, about 30 mph to about 80 mph, about 40 mph to about 50 mph, about 40 mph to about 60 mph, about 40 mph to about 70 mph, about 40 mph to about 80 mph, about 50 mph to about 60 mph, about 50 mph to about 70 mph, about 50 mph to about 80 mph, about 60 mph to about 70 mph, about 60 mph to about 80 mph, or about 70 mph to about 80 mph. In some embodiments, the UAV is configured to move at a UAV speed of about 1 mph, about 5 mph, about 10 mph, about 20 mph, about 30 mph, about 40 mph, about 50 mph, about 60 mph, about 70 mph, or about 80 mph.

In some embodiments, the tether has a length of about 2 m to about 150 m. In some embodiments, the tether has a length of at least about 2 m. In some embodiments, the tether has a length of at most about 150 m. In some embodiments, the tether has a length of about 2 m to about 4 m, about 2 m to about 8 m, about 2 m to about 16 m, about 2 m to about 24 m, about 2 m to about 36 m, about 2 m to about 72 m, about 2 m to about 100 m, about 2 m to about 150 m, about 4 m to about 8 m, about 4 m to about 16 m, about 4 m to about 24 m, about 4 m to about 36 m, about 4 m to about 72 m, about 4 m to about 100 m, about 4 m to about 150 m, about 8 m to about 16 m, about 8 m to about 24 m, about 8 m to about 36 m, about 8 m to about 72 m, about 8 m to about 100 m, about 8 m to about 150 m, about 16 m to about 24 m, about 16 m to about 36 m, about 16 m to about 72 m, about 16 m to about 100 m, about 16 m to about 150 m, about 24 m to about 36 m, about 24 m to about 72 m, about 24 m to about 100 m, about 24 m to about 150 m, about 36 m to about 72 m, about 36 m to about 100 m, about 36 m to about 150 m, about 72 m to about 100 m, about 72 m to about 150 m, or about 100 m to about 150 m. In some embodiments, the tether has a length of about 2 m, about 4 m, about 8 m, about 16 m, about 24 m, about 36 m, about 72 m, about 100 m, or about 150 m.

In some embodiments the set value is about 1 cm to about 20 cm. In some embodiments the set value is at least about 1 cm. In some embodiments the set value is at most about 20 cm. In some embodiments the set value is about 1 cm to about 2 cm, about 1 cm to about 4 cm, about 1 cm to about 6 cm, about 1 cm to about 8 cm, about 1 cm to about 10 cm, about 1 cm to about 12 cm, about 1 cm to about 14 cm, about 1 cm to about 16 cm, about 1 cm to about 18 cm, about 1 cm to about 20 cm, about 2 cm to about 4 cm, about 2 cm to about 6 cm, about 2 cm to about 8 cm, about 2 cm to about 10 cm, about 2 cm to about 12 cm, about 2 cm to about 14 cm, about 2 cm to about 16 cm, about 2 cm to about 18 cm, about 2 cm to about 20 cm, about 4 cm to about 6 cm, about 4 cm to about 8 cm, about 4 cm to about 10 cm, about 4 cm to about 12 cm, about 4 cm to about 14 cm, about 4 cm to about 16 cm, about 4 cm to about 18 cm, about 4 cm to about 20 cm, about 6 cm to about 8 cm, about 6 cm to about 10 cm, about 6 cm to about 12 cm, about 6 cm to about 14 cm, about 6 cm to about 16 cm, about 6 cm to about 18 cm, about 6 cm to about 20 cm, about 8 cm to about 10 cm, about 8 cm to about 12 cm, about 8 cm to about 14 cm, about 8 cm to about 16 cm, about 8 cm to about 18 cm, about 8 cm to about 20 cm, about 10 cm to about 12 cm, about 10 cm to about 14 cm, about 10 cm to about 16 cm, about 10 cm to about 18 cm, about 10 cm to about 20 cm, about 12 cm to about 14 cm, about 12 cm to about 16 cm, about 12 cm to about 18 cm, about 12 cm to about 20 cm, about 14 cm to about 16 cm, about 14 cm to about 18 cm, about 14 cm to about 20 cm, about 16 cm to about 18 cm, about 16 cm to about 20 cm, or about 18 cm to about 20 cm. In some embodiments the set value is about 1 cm, about 2 cm, about 4 cm, about 6 cm, about 8 cm, about 10 cm, about 12 cm, about 14 cm, about 16 cm, about 18 cm, or about 20 cm.

The UAV system of claim 1, wherein the tether is configured to provide power, communications, or both between the UAV and the mobile platform. In some embodiments the tether is configured to provide a tensile force between the UAV and the mobile platform. In some embodiments at least one of the UAV, the mobile platform, and the tether comprise a tensiometer configured to measure a tether tension force. In some embodiments the navigation module further directs at least one of the UAV propeller and the platform propeller based on the tether tension force. In some embodiments the navigation module directs at least one of the UAV propeller and the platform propeller to maintain the tether tension force below a predetermined threshold. In some embodiments, the navigation module directs at least one of the UAV propeller and the platform propeller during a UAV takeoff, a UAV landing, a UAV translation, a UAV rotation, or any combination thereof.

In some embodiments the selected rate is about 10 Hz to about 30 Hz. In some embodiments the selected rate is at least about 10 Hz. In some embodiments the selected rate is at most about 30 Hz. In some embodiments the selected rate is about 10 Hz to about 12 Hz, about 10 Hz to about 14 Hz, about 10 Hz to about 16 Hz, about 10 Hz to about 18 Hz, about 10 Hz to about 20 Hz, about 10 Hz to about 22 Hz, about 10 Hz to about 24 Hz, about 10 Hz to about 26 Hz, about 10 Hz to about 28 Hz, about 10 Hz to about 30 Hz, about 12 Hz to about 14 Hz, about 12 Hz to about 16 Hz, about 12 Hz to about 18 Hz, about 12 Hz to about 20 Hz, about 12 Hz to about 22 Hz, about 12 Hz to about 24 Hz, about 12 Hz to about 26 Hz, about 12 Hz to about 28 Hz, about 12 Hz to about 30 Hz, about 14 Hz to about 16 Hz, about 14 Hz to about 18 Hz, about 14 Hz to about 20 Hz, about 14 Hz to about 22 Hz, about 14 Hz to about 24 Hz, about 14 Hz to about 26 Hz, about 14 Hz to about 28 Hz, about 14 Hz to about 30 Hz, about 16 Hz to about 18 Hz, about 16 Hz to about 20 Hz, about 16 Hz to about 22 Hz, about 16 Hz to about 24 Hz, about 16 Hz to about 26 Hz, about 16 Hz to about 28 Hz, about 16 Hz to about 30 Hz, about 18 Hz to about 20 Hz, about 18 Hz to about 22 Hz, about 18 Hz to about 24 Hz, about 18 Hz to about 26 Hz, about 18 Hz to about 28 Hz, about 18 Hz to about 30 Hz, about 20 Hz to about 22 Hz, about 20 Hz to about 24 Hz, about 20 Hz to about 26 Hz, about 20 Hz to about 28 Hz, about 20 Hz to about 30 Hz, about 22 Hz to about 24 Hz, about 22 Hz to about 26 Hz, about 22 Hz to about 28 Hz, about 22 Hz to about 30 Hz, about 24 Hz to about 26 Hz, about 24 Hz to about 28 Hz, about 24 Hz to about 30 Hz, about 26 Hz to about 28 Hz, about 26 Hz to about 30 Hz, or about 28 Hz to about 30 Hz. In some embodiments the selected rate is about 10 Hz, about 12 Hz, about 14 Hz, about 16 Hz, about 18 Hz, about 20 Hz, about 22 Hz, about 24 Hz, about 26 Hz, about 28 Hz, or about 30 Hz.

In some embodiments locational module estimates the relative three-dimensional position of the UAV to the mobile platform in real-time. In some embodiments the relative three-dimensional position comprises, a vector, a distance, a position, an altitude, an attitude, a velocity, an acceleration, an orientation, or a combination thereof. In some embodiments the sensor comprises one or more of: a vision sensor, a proximity sensor, and an inertial sensor, a gyroscope, a pressure sensor, a tachometer, an anemometer, a camera, an ultrasonic sensor, a light detection and ranging (LIDAR) sensor, and an inertial measurement unit. In some embodiments the sensor does not include a global positioning system (GPS) sensor. In some embodiments the mobile platform further comprises a tracking target. In some embodiments the sensor comprises a camera, and wherein the sensor data comprises a picture of the tracking target. In some embodiments the tracking target comprises: a static tracking target; a dynamic tracking target; an infrared or ultraviolet marker; or any combination thereof. In some embodiments the static tracking target comprises a series of nested tracking targets. In some embodiments the series of nested tracking targets are co-centered. In some embodiments the tracking target on the mobile platform is located in a position that can be seen by the UAV. In some embodiments the tracking target on the mobile platform is located in a position that can be seen by the UAV. In some embodiments the dynamic tracking target is configured to change in color, size, shape, number, flash rate, or any combination thereof. In some embodiments the dynamic tracking target is configured to change based on the relative three-dimensional position of the UAV to the mobile platform. In some embodiments the tracking target comprises a RF device, an accelerometer within the mobile platform, a gyroscope within the mobile platform, or any combination thereof. In some embodiments the set value is associated with a time window. In some embodiments the set value comprises a variable set value. In some embodiments the variable set value comprises a landing set value, a taking set value, an operational set value, a translation set value, or any combination thereof. In some embodiments at least one of the UAV and the mobile platform comprise a wireless communication unit configured to receive an instruction from a remote operator. In some embodiments the instruction comprises at least one of the relative three-dimensional position, a mobile platform heading, a mobile platform velocity, a UAV heading, a UAV velocity, and a UAV altitude. In some embodiments the mobile platform further comprises a tether spool. In some embodiments the tethered landing application further comprises a spooling module directing the tether spool based at least on the relative three-dimensional position. In some embodiments, the digital processing device is attached to the UAV or the mobile platform.

In some embodiments, the navigation module is further configured to direct the at least one of the UAV propeller and the platform propeller based on the relative three-dimensional position, to maintain a substantially constant relative position of the UAV to the mobile platform. In some embodiments, the substantially constant relative position comprises a substantially constant relative X-Y position of the UAV to the mobile platform. In some embodiments, the substantially constant relative position comprises a substantially constant relative Z position of the UAV to the mobile platform. In some embodiments, the substantially constant relative position comprises a substantially constant relative three-dimensional position of the UAV to the mobile platform. In some embodiments, the navigation module is further configured to direct the UAV propeller to maintain a substantially constant altitude of the UAV.

In another aspect, provided herein is a non-transitory computer-readable storage media encoded with a computer program including instructions executable by a processor to allow control of an unmanned aerial vehicle (UAV) relative to a mobile platform, the UAV tethered to the mobile platform, the computer program comprising: a first software module receiving data from one or more sensors at a selected rate; a second software module estimating a state of the UAV relative to the mobile platform based on the data; and a third software module controlling 3D motion of the UAV based on the estimated state of the UAV relative to the mobile platform thereby positioning the UAV within a pre-determined envelope relative to the mobile platform.

Another aspect provided herein is a method for controlling a tethered UAV having a propeller and a sensor by a mobile platform, the method comprising: receiving a sensor data from the sensor; estimating a relative three-dimensional position of the UAV to the mobile platform, based on the sensor data; and directing the propeller based on the relative three-dimensional position, to adjust the relative three-dimensional position within a set value.

In some embodiments, the set value comprises at least one of a landing set value, a hovering set value, a translation set value, a rotation set value, and a take-off set value.

In some embodiments the set value is about 1 cm to about 20 cm. In some embodiments the set value is at least about 1 cm. In some embodiments the set value is at most about 20 cm. In some embodiments the set value is about 1 cm to about 2 cm, about 1 cm to about 4 cm, about 1 cm to about 6 cm, about 1 cm to about 8 cm, about 1 cm to about 10 cm, about 1 cm to about 12 cm, about 1 cm to about 14 cm, about 1 cm to about 16 cm, about 1 cm to about 18 cm, about 1 cm to about 20 cm, about 2 cm to about 4 cm, about 2 cm to about 6 cm, about 2 cm to about 8 cm, about 2 cm to about 10 cm, about 2 cm to about 12 cm, about 2 cm to about 14 cm, about 2 cm to about 16 cm, about 2 cm to about 18 cm, about 2 cm to about 20 cm, about 4 cm to about 6 cm, about 4 cm to about 8 cm, about 4 cm to about 10 cm, about 4 cm to about 12 cm, about 4 cm to about 14 cm, about 4 cm to about 16 cm, about 4 cm to about 18 cm, about 4 cm to about 20 cm, about 6 cm to about 8 cm, about 6 cm to about 10 cm, about 6 cm to about 12 cm, about 6 cm to about 14 cm, about 6 cm to about 16 cm, about 6 cm to about 18 cm, about 6 cm to about 20 cm, about 8 cm to about 10 cm, about 8 cm to about 12 cm, about 8 cm to about 14 cm, about 8 cm to about 16 cm, about 8 cm to about 18 cm, about 8 cm to about 20 cm, about 10 cm to about 12 cm, about 10 cm to about 14 cm, about 10 cm to about 16 cm, about 10 cm to about 18 cm, about 10 cm to about 20 cm, about 12 cm to about 14 cm, about 12 cm to about 16 cm, about 12 cm to about 18 cm, about 12 cm to about 20 cm, about 14 cm to about 16 cm, about 14 cm to about 18 cm, about 14 cm to about 20 cm, about 16 cm to about 18 cm, about 16 cm to about 20 cm, or about 18 cm to about 20 cm. In some embodiments the set value is about 1 cm, about 2 cm, about 4 cm, about 6 cm, about 8 cm, about 10 cm, about 12 cm, about 14 cm, about 16 cm, about 18 cm, or about 20 cm.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
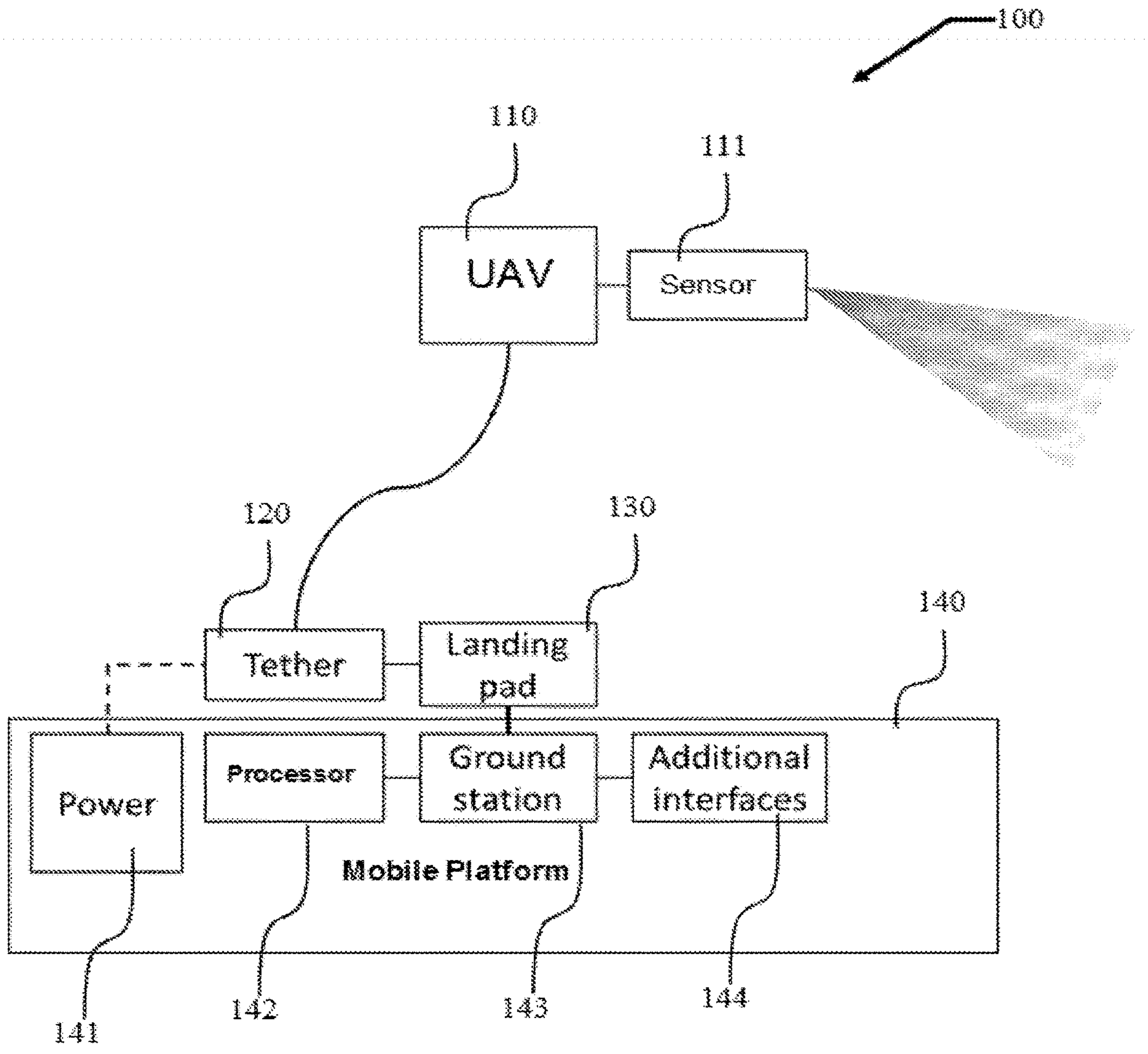
FIG. 1 shows an exemplary schematic diagram of an exemplary UAV system, in accordance with some embodiments.

Tethering is a technology that has recently gained traction in support of long-duration UAS missions. Systems and methods of using a tethered UAS system may have several significant advantages, including nearly unlimited flight time, heavier payloads, high-bandwidth communication, and being RF quiet. A tethered UAS system may be capable of nearly unlimited flight time, since tethered UAS can fly for hours or days at a time. A tethered UAS system may be capable of heavier payloads, since tethered UAS can carry heavier payloads than their free-flying counterparts because the tether eliminates weight of the battery. A tethered UAS system may be capable of high-bandwidth communication, since tethered UAS can communicate with their ground control station (GCS) over a wired connection, providing a higher bandwidth secured communication channel than a typical UAS wireless link. A tethered UAS system may be capable of being RF quiet, since tethered UAS do not need wireless communications, and therefore do not need to emit RF signals. They are also not subject to RF interference, which makes tethered UAS suitable platforms for RF/SIGINT sensors and/or communication relays.

However, a tethered UAS system may encounter challenges in operation, especially from moving platforms. Such challenges may include power management, tether management, station keeping, and mobility. A tethered UAS system may encounter challenges related to power management, since UAS use a lot of power. Therefore, the tether base station may need to supply large amounts of power through a very thin tether line, thereby increasing the risks of overheating, component failure, reduced reliability, or even fires. A tethered UAS system may encounter challenges related to tether management, since the tether base station must automatically reel-out and reel-in tether line as the distance from the tether base to UAS changes. These changes may occur due to GPS inaccuracies, wind gusts, etc. These challenges may be mitigated with station keeping. A tethered UAS system may encounter challenges related to station keeping, since the UAS must maintain position over the tether base with high accuracy. Poor station keeping may make tether management more difficult and reduce the lifespan of the system. For this reason, station keeping in altitude may be the most important of the three motion dimensions. However, this also may be the most difficult dimension to measure because GPS altitude accuracy may be significantly worse than GPS position accuracy. A tethered UAS system may encounter challenges related to mobility, since one of the most significant shortcomings of tethered UAS may be mobility. A tethered UAS may be essentially "stuck" hovering above a stationary point on the ground.

The present disclosure provides a software-hardware system that performs fully-autonomous optically-guided precision launch, navigation, and landing from moving vehicles or moving vessels, toward mobile UAS operations. Generally, mobile UAS operations may be extremely difficult, due to the lack of a "home" position, winds and turbulence, and the high precision control required during takeoff and landing. UAS technology may not easily facilitate operations from moving platforms. Systems and methods of the present disclosure may feature a vision-aided relative navigation system that is configured to use precise air-to-vehicle observations to accurately estimate the relative UAS-vehicle state, which can be used to route and control the UAS safely to the deck, thereby improving the safety, reliability, and results of mobile UAS operations. Autonomous optically-guided precision navigation technology of the present disclosure may enable mobile tethered UAS applications by addressing key challenges, as described elsewhere herein.

Systems and methods of the present disclosure may feature an optical guidance technology that uses a small camera on the UAS to detect and track a specialized target pattern on the vehicle. The optical tracking software may run on a small computer installed on-board the UAS. This technology may automatically compensate for the motion of the vehicle and wind turbulence, updating the UAS controls at a high frequency (e.g., 400 Hz). This may enable a UAS to launch while moving and maintain a precise position above the tether base while ascending. On-board processing may be performed minimize communication delays and increase UAS autonomy and reliability.

Systems and methods of the present disclosure may feature precise station-keeping control for the UAS, to maintain UAS position and altitude above the tether base, even as the vehicle moves. This capability may be critical for mobile tethered UAS operations, to allow the UAS to autonomously move with the tether base. Optical guidance is generally more accurate than GPS, especially in altitude. Furthermore, optical systems do not rely on GPS, so they can be used in urban settings and locations where GPS is degraded or jammed. This can enable GPS-optional or GPS-free operation, in which the system tracks the host vehicle visually, so it does not need GPS or other RF-based positioning systems (e.g., RTK and UWB) to operate. This system may also benefit from very fast update rates (e.g., at least 30 Hz for optical measurements and 400 Hz for control) to compensate for vehicle motion and wind gusts.

During landing, the UAS can be autonomously guided onto a small landing pad on the vehicle. Systems and methods of the present disclosure may feature autonomous landing that can be operated reliably up to vehicle speeds of about 20-80 mph, with landing accuracy of about 10-100 cm. A securing mechanism may be configured to automatically lock the UAS into place immediately upon landing.

In some cases, tether power is provided by the vehicle or from an onboard generator, which may be nominally several hundred watts (e.g., about 800 W). Additional batteries can be used to provide power during peak draw (e.g., up to 3000 W) for short bursts. Power may be stepped up to 400 VDC for the tether, which is then converted at the aircraft to 24 VDC. The system may use a generator onboard the ground vehicle for power supply, but power may be provided directly from the vehicle as well. The tether can also support high data transmission rates in excess of 100 Mbps.

Systems and methods of the present disclosure may feature a precision optical navigation system, a core technology that enables mobile tethered UAS operations. The precision optical navigation system may provide precision launch, landing, and station-keeping from a moving vehicle or vessel, without the need for GPS or RF emitters. It may provide a level of accuracy needed for successful operations, with minimal footprint on the ground vehicle. Furthermore, the precision optical navigation system may offer a level of reliability not available with other solutions, since it operates without communications from the ground vehicle. For example, if the ground vehicle were to lose connectivity or power, the optical navigation system may be configured to continue to operate, uninterrupted, and guide the UAS to a precision landing.

The precision navigation system may comprise three technology components, which may be essential technologies for enabling mobile operations. In the system, these components may work together in a tight high-rate feedback control loop. Many commercially available precision landing solutions may only provide the first of the three, which may result in a fragile solution that can operate from fixed positions, but may not work for moving platforms. The three primary parts of the navigation system may include detection, to precisely measure the location of the host vehicle and navigation target; target state estimation, to maintain accuracy in a moving environment and operate through rapidly changing conditions; and UAS control, to actively navigate the aircraft and reject disturbances (e.g., wind gusts) in a relative framework where both the aircraft and ground vehicle are constantly moving.

These technologies may enable all three phases of mobile tethered operations: (a) precision launch, (b) relative navigation, and (c) precision landing from a moving vehicle. As described in detail herein, these core components of the optical navigation system may be designed to provide the necessary guidance, navigation, and control for tethered UAS operations from moving ground vehicles. Generally, the term "precision navigation" may be used to encompass all three of these phases of operations. For example, although some images shown are from vessels, the navigation system can operate equally well from moving ground vehicles.

Provided herein, per FIGS. 1-10 is an unmanned aerial vehicle (UAV) system.

FIG. 1 shows an exemplary schematic diagram of an exemplary UAV system, in accordance with some embodiments. Per FIG. 1, the UAV system 100 comprises a UAV 110, a tether 120, a landing pad 130, and a mobile platform 140. In some embodiments the UAV 110 comprises a sensor 111. In some embodiments the sensor 111 is configured to measure a sensor data. In some embodiments the UAV 110 further comprises a propeller. In some embodiments the mobile platform 140 comprises a power source 141, a processor 142, a ground station 143, and an additional interface 144.

Figure 2:
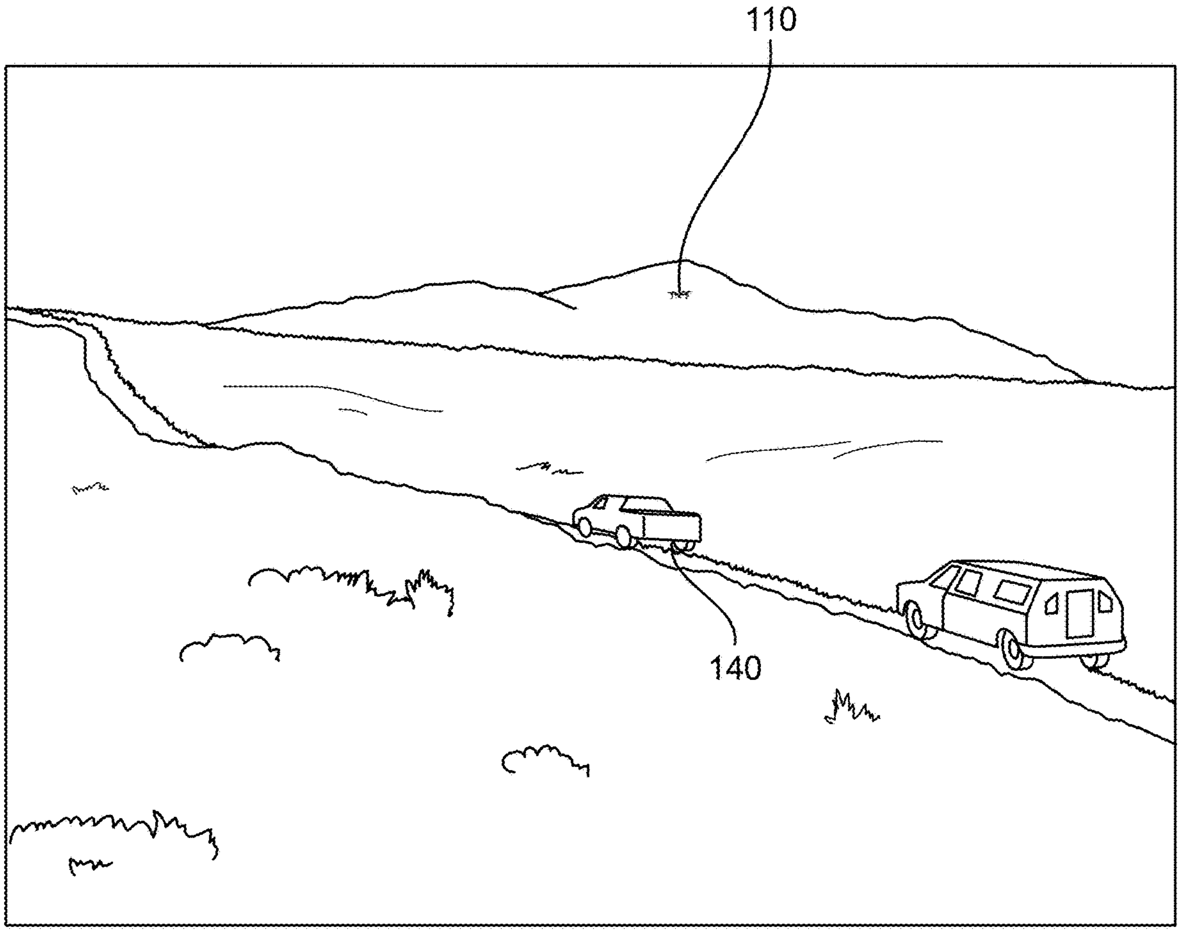
FIG. 2 is an image of an exemplary UAV system comprising a UAV and a mobile platform, in accordance with some embodiments.

FIG. 2 is an image of an exemplary UAV system comprising a UAV and a mobile platform, in accordance with some embodiments. As seen in FIG. 2, the UAV 110 may comprise a truck, a car, or a van. Alternatively, in some embodiments, the mobile platform 140 comprises a sled, person, ship, aircraft, submarine, bicycle, motorcycle, crane, tractor, wind turbine, or a combination thereof. One with ordinary skill in the art will easily recognize that any alternative powered or unpowered vehicles or platforms may be used as the mobile platform 140. In some embodiments, the mobile platform 140 is configured to move at a platform speed of about 1 mph to about 25 mph. In some embodiments, the UAV 110 is configured to move at a UAV speed of about 1 mph to about 80 mph A specific mobile platform speed may be required to ensure proper locational placement of the UAV 110 with respect to the mobile platform. In some cases, a mobile platform speed greater than a translation speed of the UAV 110 reduces the maximum elevation at which the UAV 110 can view its surroundings. In some embodiments, the UAV 110 is configured to fly at an altitude of about 2 m to about 150 m. In some embodiments, the tether 120 has a length of about 2 m to about 150 m. In some embodiments, the UAV 110 is configurable for a payload capacity of about 1 kg to about 10 kg. One with ordinary skill in the art will easily recognize that advancements in UAV 110 technology and configurations may enable higher mobile platform speeds, higher UAV 110 elevations, and payload capacities.

Figure 3:
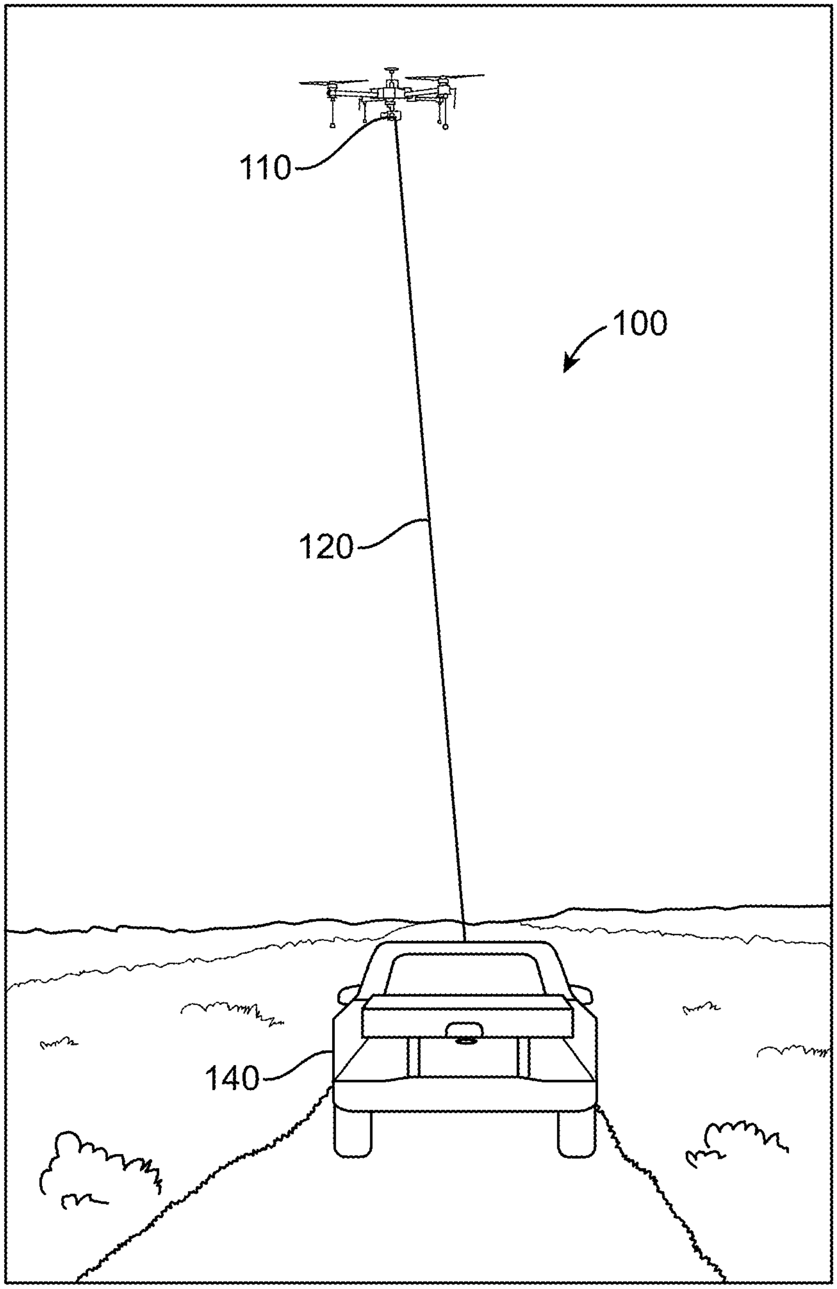
FIG. 3 is an image of an exemplary UAV hovering above and tethered to a mobile platform, in accordance with some embodiments.

FIG. 3 is an image of an exemplary UAV hovering above and tethered to a mobile platform, in accordance with some embodiments. As seen in FIG. 3, the tether 120 is connected between the mobile platform 140 and the UAV 110. In some embodiments, the tether 120 is permanently connected to at least one of the mobile platform 140 and the UAV 110. In some embodiments, the tether 120 is removably connected to at least one of the mobile platform 140 and the UAV 110. In some embodiments, the removable tether 120 enables the use of two or more different tethers 120 to be used on the UAV system 100 depending on the environment. As an example, traversal of rough terrain by the mobile platform 140 may require the use of a tether 120 with built in flexibility or strain relief to increase the stability, and reduce the impulse load on the UAV 110.

In some embodiments, the tether 120 is configured to provide power, communications, or both between the UAV 110 and the mobile platform 140. In some embodiments the tether 120 is configured to provide a tensile force between the UAV 110 and the mobile platform 140. The tether 120 eliminates the need for a wireless communication element or an energy storage device within the UAV 110 to increase flight time, payload capacity, and bandwidth. Further, the elimination of a wireless communication element is more secure, and cannot be intercepted or interfered by other parties. In some embodiments, the tether 120 comprises multiple interwoven or parallel components configured for tensile strengthening, power transmission, data communications, or any combination thereof.

In some embodiments, the power source 141 comprises at least one of a generator, a battery, and a power supply of the mobile platform 140. In some embodiments the generator is configured to provide about 800 W to about 120,00 W. In some embodiments, the DC power from the power source 141 is inverted or stepped up to 240 VDC for the tether, which is then converted at the UAV 110 to 24 VDC.

Figure 4:
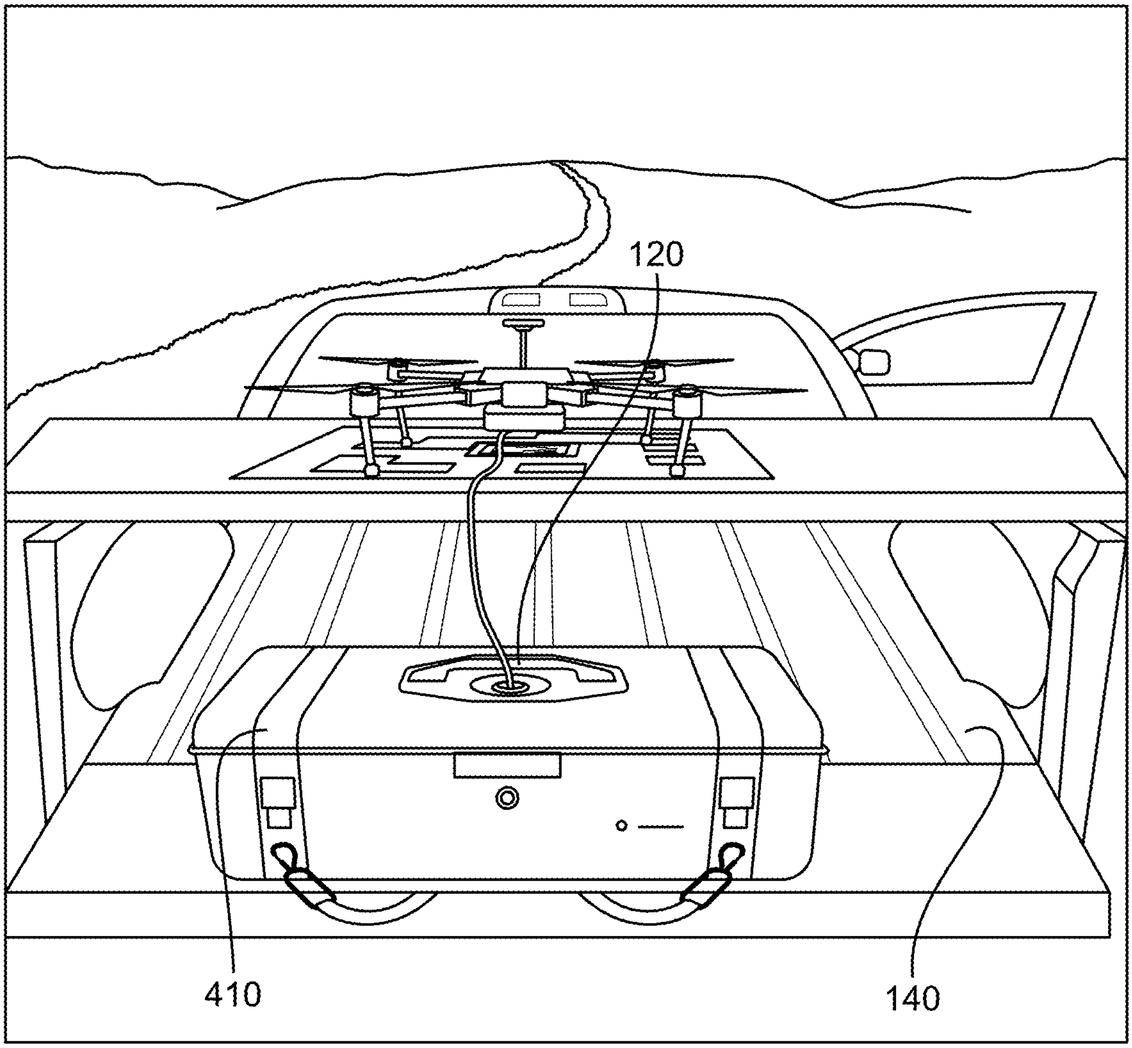
FIG. 4 is an image of an exemplary mobile platform comprising a tether spool, in accordance with some embodiments.

FIG. 4 is an image of an exemplary mobile platform comprising a tether spool, in accordance with some embodiments. As seen in FIG. 4, the mobile platform 140 may further comprise a tether spool 410. In some embodiments the tether spool 410 is configured to lengthen or shorten a length of the tether 120. In some embodiments the tether spool 410 is connected to at least one of the UAV 110 and the mobile platform 140. The spool 410 may prevent damage to the tether 120 imparted by any unnecessary slack during operation of the UAV 110 at sub-upmost elevations. Further the spool 410 may prevent damage to the tether 120 during transportation and/or storage of the UAV system 100 when not in use. In some cases the processor of the mobile platform 140 may instruct the spool 410 to expand or contract the tether 120 due to measured or predicted weather data.

In some embodiments the sensor 111 comprises one or more of: a vision sensor 111, a proximity sensor 111, and an inertial sensor 111, a gyroscope, a pressure sensor 111, a tachometer, an anemometer, a camera, an ultrasonic sensor 111, a light detection and ranging (LIDAR) sensor 111, and an inertial measurement unit. In some embodiments the sensor 111 does not include a global positioning system (GPS) sensor 111. Vision sensors and computer vision are often more precise than GPS sensors, and are more secure. In some embodiments the UAV system 100 further comprises a payload attached to the UAV 110. In some embodiments, the payload comprises a camera, a video camera, a sensor, or any combination thereof.

In some embodiments, the processor 142 comprises a digital processing device comprising: at least one processor, an operating system configured to perform executable instructions, a memory, and a computer program including instructions executable by the digital processing device to create a tethered landing application comprising: a transmission module receiving the sensor data from the sensor 111 at a selected rate; a locational module estimating a relative three-dimensional position of the UAV 110 to the mobile platform 140, based on the sensor data; and a navigation module directing at least one of the UAV propeller and the mobile platform 140 based on the relative three-dimensional position, to adjust the relative three-dimensional position within a set value. In some embodiments, the tethered landing application repeats for a plurality of times. In some embodiments the set value is about 1 cm to about 20 cm. In some embodiments, the set value comprises at least one of a landing set value, a hovering set value, a translation set value, a rotation set value, and a take-off set value. In some embodiments the selected rate is about 10 Hz to about 30 Hz. In some embodiments the processor 142 further comprises an Android Tactical Assault Kit (ATAK) application. ATAK is an Android smartphone based geo-spatial infrastructure application which provides up-to-the second geospatial data.

In some embodiments locational module estimates the relative three-dimensional position of the UAV 110 to the mobile platform 140 in real-time. In some embodiments the relative three-dimensional position comprises, a vector, a distance, a position, an altitude, an attitude, a velocity, an acceleration, an orientation, or a combination thereof. In some embodiments the set value is associated with a time window. In some embodiments the set value comprises a variable set value. In some embodiments the variable set value comprises a landing set value, a taking set value, an operational set value, a translation set value, or any combination thereof. In some embodiments at least one of the UAV 110 and the mobile platform 140 comprise a wireless communication unit configured to receive an instruction from a remote operator. In some embodiments the instruction comprises at least one of the relative three-dimensional position, a mobile platform heading, a mobile platform velocity, a UAV heading, a UAV velocity, and a UAV altitude. In some embodiments the tethered landing application further comprises a spooling module directing the tether spool based at least on the relative three-dimensional position.

In some embodiments at least one of the UAV 110, the mobile platform 140, and the tether 120 comprise a tensiometer configured to measure a tether tension force. In some embodiments the navigation module further directs at least one of the UAV propeller and the platform propeller based on the tether tension force. In some embodiments the navigation module directs at least one of the UAV propeller and the platform propeller to maintain the tether tension force below a predetermined threshold. In some embodiments, the navigation module directs at least one of the UAV propeller and the platform propeller during a UAV takeoff, a UAV landing, a UAV translation, a UAV rotation, or any combination thereof.

Another aspect provided herein is a non-transitory computer-readable storage media encoded with a computer program including instructions executable by a processor to allow control of a unmanned aerial vehicle (UAV) relative to a mobile platform, the UAV tethered to the mobile platform, comprising: a software module receiving data from the one or more sensors at a selected rate; a software module estimating a state of the UAV relative to the mobile platform based on the data; and a software module controlling 3D motion of the UAV based on the estimated state of the UAV relative to the mobile platform thereby positioning the UAV within a pre-determined envelope relative to the mobile platform.

Another aspect provided herein is a non-transitory computer-readable storage media encoded with a computer program including instructions executable by a processor to allow control of a unmanned aerial vehicle (UAV) relative to a mobile platform, the UAV tethered to the mobile platform, comprising: a software module receiving data from the one or more sensors at a selected rate; a software module estimating a state of the UAV relative to the mobile platform based on the data; and a software module controlling 3D motion of the UAV based on the estimated state of the UAV relative to the mobile platform thereby positioning the UAV within a pre-determined envelope relative to the mobile platform.

Another aspect provided herein is a method for controlling a tethered UAV having a propeller and a sensor by a mobile platform, the method comprising: receiving a sensor data from the sensor; estimating a relative three-dimensional position of the UAV to the mobile platform, based on the sensor data; and directing the UAV propeller based on the relative three-dimensional position, to adjust the relative three-dimensional position within a set value. In some embodiments, the set value comprises at least one of a landing set value, a hovering set value, a translation set value, a rotation set value, and a take-off set value.

UAV

Any description herein of a UAV may apply to any type of unmanned movable object (e.g., which may traverse the air, land, water, or space). The UAV may be capable of responding to commands from a remote controller. The remote controller may be not connected to the UAV; the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The UAV may be configured to launch and land on a mobile platform. In some embodiments, the UAV is configured to be resistant to jamming and/or hacking. In some embodiments, the devices, methods, and digital processing devices are configured for UAVs of various airframe sizes, weights, and dimensions.

The UAV may be an aerial vehicle. The UAV may have one or more propulsion units or propellers that may permit the UAV to move about in the air. In some instances, the UAV may be able to rotate about one, two, three, or more axes of rotation. The axes of rotation may be orthogonal to one another. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate.

Mobile Platform

Figure 9:
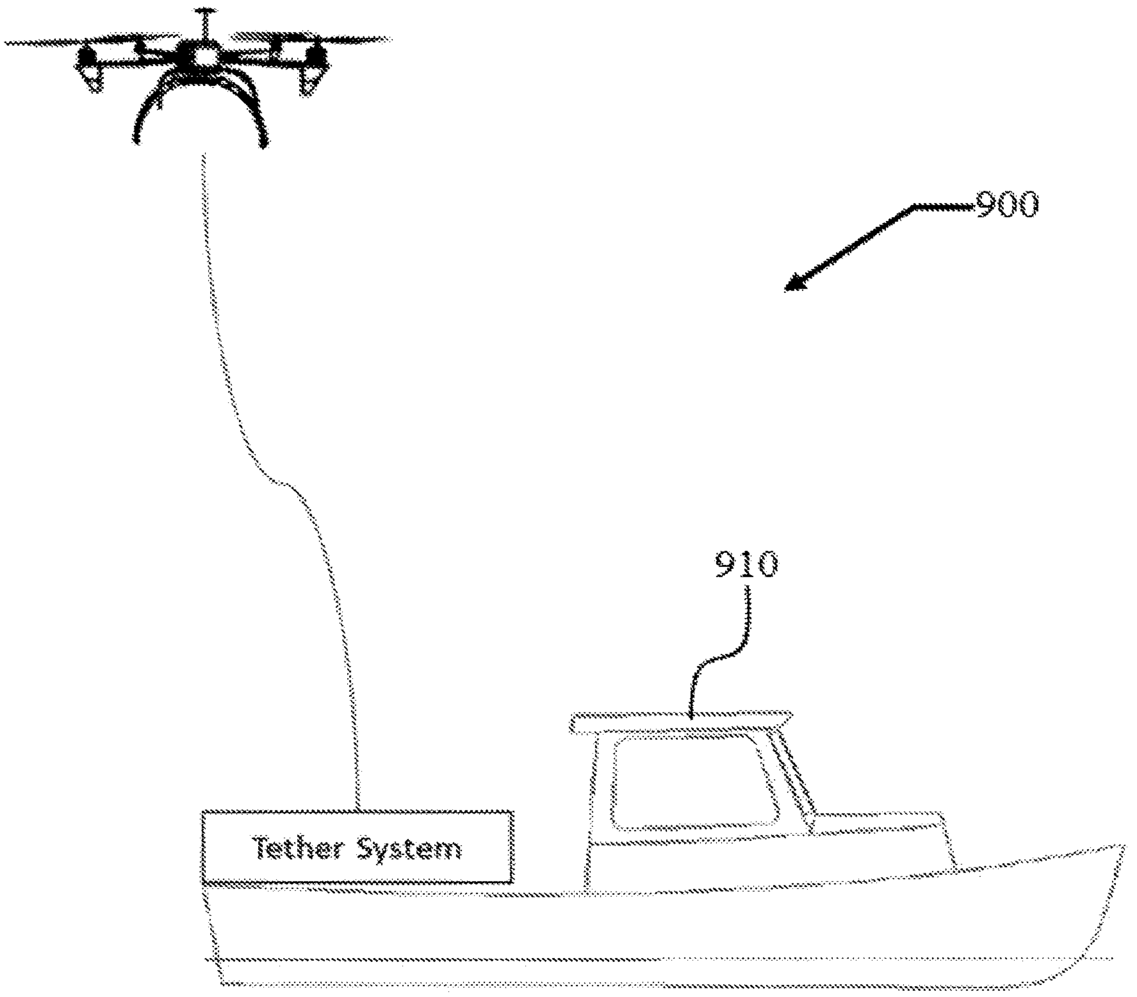
FIG. 9 shows an exemplary schematic diagram of an exemplary UAV system comprising a boat mobile platform, in accordance with some embodiments.

Any description herein of a mobile platform may apply to any type of movable object (e.g., which may traverse the air, land, water, or space). The mobile platform may be an unmanned surface vehicle (USV) or an unmanned ground vehicle (UGV). The mobile platform may be a boat, truck, car, van, sled, person, ship, aircraft, submarine, bicycle, motorcycle, crane, tractor, wind turbine, or any other platform that moves relative to its surrounding environment. In some cases, the mobile platform may be any type of movable object carrying a power source thereon. In further cases, a tether may be reliably or permanently connected to the mobile platform on one end of the tether. FIG. 9 shows an exemplary schematic diagram of an exemplary UAV system comprising a boat mobile platform, in accordance with some embodiments. As seen in FIG. 9, the mobile platform may comprise a boat 910. A water-based mobile platform, such as a boat 910, enables the UAV system 900 to be used throughout the world. The mobile platform may be configured to launch and receive the UAV.

Tether

Any description herein of tether may apply to any type of wire, cable, thread, tube, or any other elongate structure that connects physically or mechanically connects the UAV to the mobile platform.

In some cases, the tether may be unspooled when the UAV takes off. In further cases, the tether may unspool or spool with or without any human intervention. The tether may be configured to prevent damage to the UAV and/or the mobile platform cause by wind gusts and/or GPS inaccuracies.

If the UAV operated from a manned vehicle, a user can take action to replenish a drone's batteries. For example, a user may exchange a depleted battery for a fully charged one. In another example, a user may plug in the drone to an external power source. In some cases, it is possible to eliminate the need to exchange or recharge batteries onboard the drones by providing power over a wire that is connected on one end to a power source and one the other end to a drone. This wire can be referred to as a tether. The tether can provide both power and/or data communication between the drone and the ground. For example, data communication can be via optical fiber, Ethernet, or other protocol. In further cases, such communication is bi-directional.

In some cases, the length of the tether is around 50 meters. In other cases, the length of the tether is around 100 meters. In other cases, the length of the tether is anywhere less than 1000 meters.

In some cases, the UAV does not have an onboard battery, thereby saving weight, the power is provided to the UAV via the tether. In some cases, the UAV has backup batteries that allow for the UAV to immediately land autonomously if the vehicle power is lost or the tether is damaged.

UAV Autonomous Launch & Landing from a Mobile Platform

In order to allow the UAV to perform its function with UAV without human intervention, high-precision, autonomous launching and landing the UAV on the host vehicle or USV is highly desired.

Figure 5:
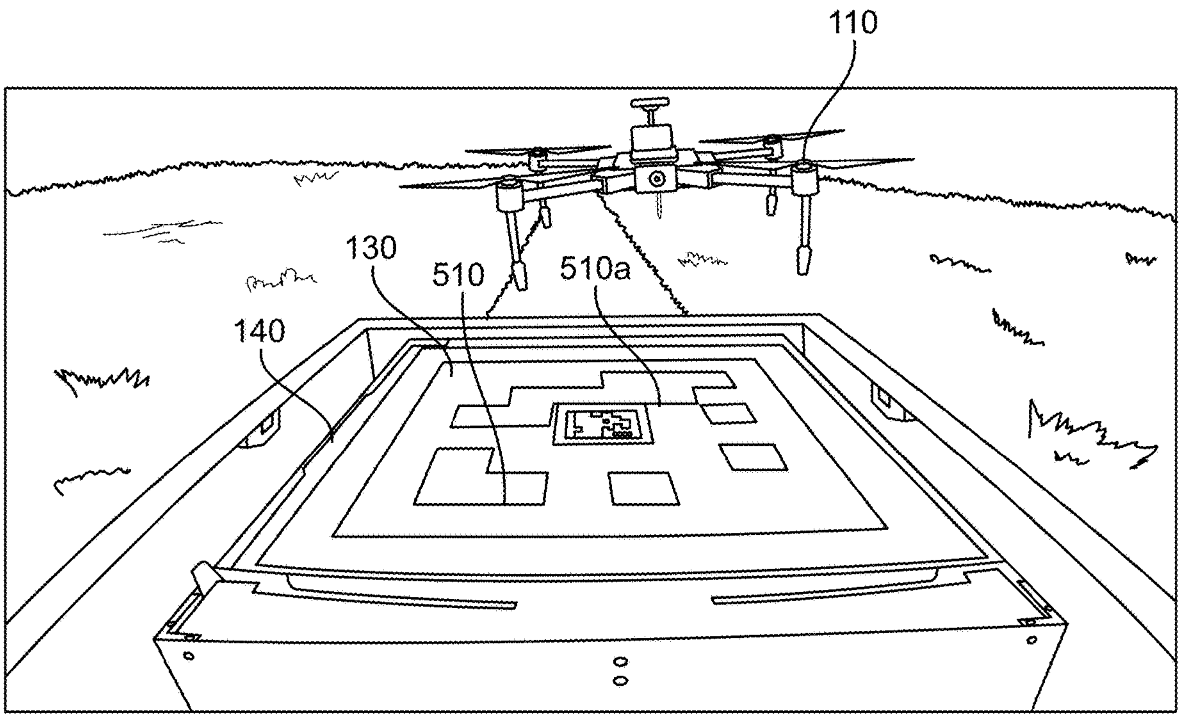
FIG. 5 is an image of an exemplary UAV landing on an exemplary mobile platform comprising landing pad having an exemplary tracking target, in accordance with some embodiments.

FIG. 5 is an image of an exemplary UAV landing on an exemplary mobile platform comprising landing pad having an exemplary tracking target, in accordance with some embodiments. As seen in FIG. 5, the mobile platform 140 comprises a landing pad 130 configured to receive the UAV 110. In some embodiments, the landing pad 130 is rigidly connected to the mobile platform 140. In some embodiments, the landing pad 130 is permanently connected to the mobile platform 140. In some embodiments, the landing pad 130 is removably connected to the mobile platform 140. In some embodiments at least one of the landing pad 130 and the mobile platform 140 comprise a tracking target 510.

Figure 6:
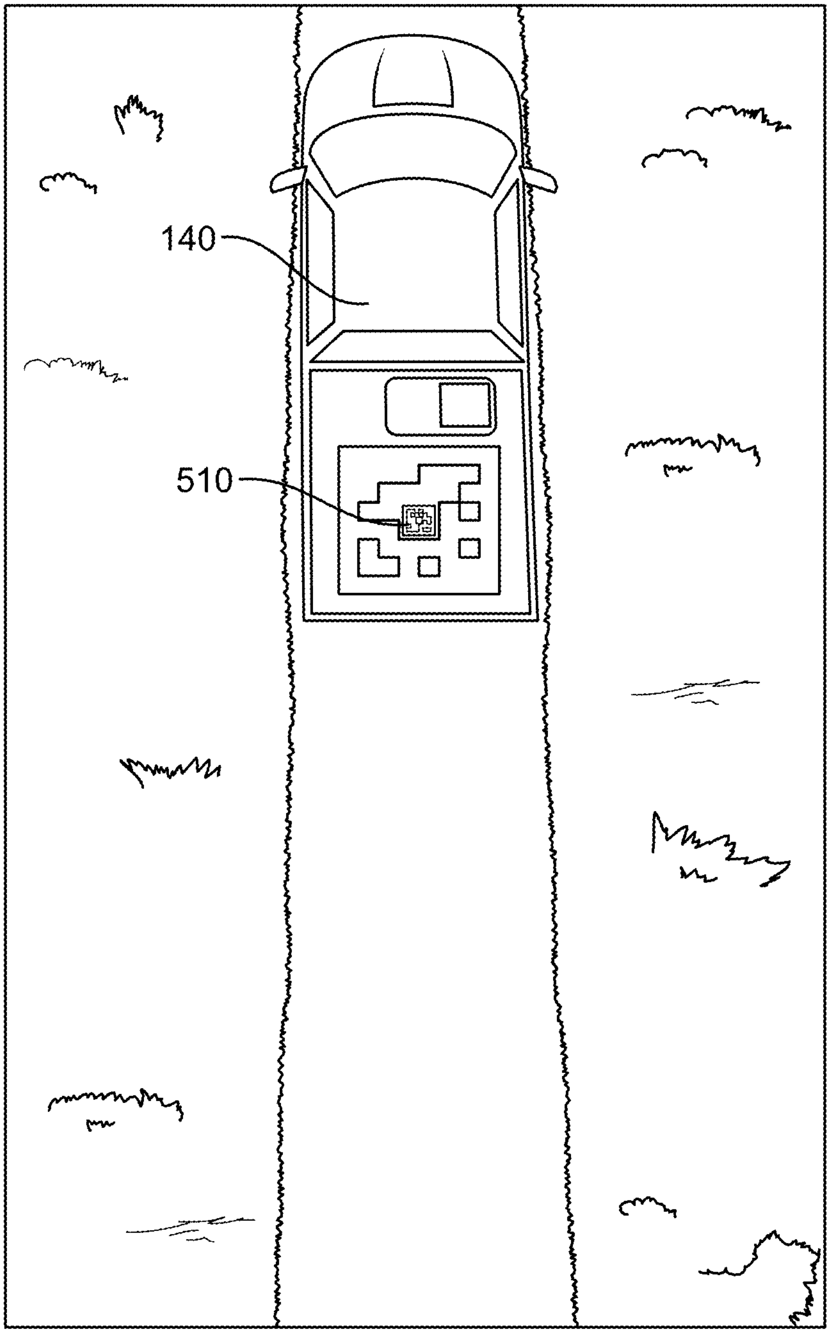
FIG. 6 is an image of a sensor data comprises a picture of a tracking target, in accordance with some embodiments.
Figure 7:
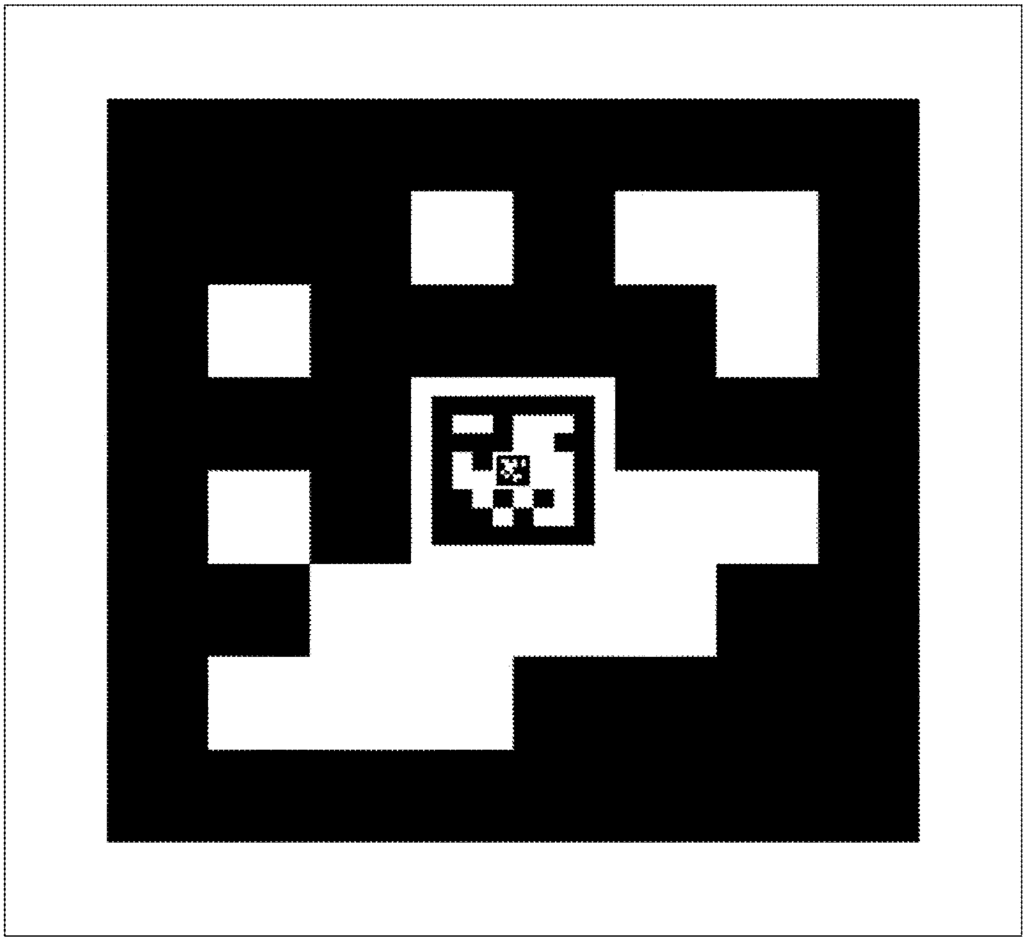
FIG. 7 is an image an exemplary nested tracking target, in accordance with some embodiments.

FIG. 6 is an image of a sensor data comprises a picture of a tracking target, in accordance with some embodiments. As seen in FIG. 6, the sensor 111 may comprise a camera, wherein the sensor data comprises a picture of the tracking target 510. In some embodiments the tracking target 510 comprises: a static tracking target; a dynamic tracking target; an infrared or ultraviolet marker; or any combination thereof. As seen, the static tracking target tracking target 510 may comprise a series of nested tracking targets 510 510 *a*. In some embodiments the series of nested tracking targets 510 510 *a* are co-centered. FIG. 7 is an image an exemplary nested tracking target, in accordance with some embodiments.

In some embodiments the tracking target 510 on the mobile platform is located in a position that can be seen by the UAV 110. In some embodiments the tracking target 510 on the mobile platform is located in a position that can be seen by the UAV 110. In some embodiments the dynamic tracking target 510 is configured to change in color, size, shape, number, flash rate, or any combination thereof. In some embodiments the dynamic tracking target 510 is configured to change based on the relative three-dimensional position of the UAV 110 to the mobile platform 140. In some embodiments the tracking target 510 comprises a RF device, an accelerometer within the mobile platform 140, a gyroscope within the mobile platform 140, or any combination thereof.

In some cases, the UAV disclosed herein is configured to vertical takeoff and land (VTOL) from moving vessels at sea, and to navigate relative to the host vessel. In some cases, this technology does not require a UAV pilot in the loop or extensive installed hardware on the vessel. In some embodiments, the autonomous system or unmanned team disclosed herein uses a UAV launch/landing pad, as a non-limiting example, the pad may be a flat 1 m×1 m surface that ensures the UAV has a safe operating location on the vessel. In other cases, the launch/landing pad may be of any sizes that are practical to be used on the mobile platform. In additional embodiments, the launch/landing pad may be a three-dimensional shape instead of a flat two-dimensional shape. In some cases, during launch, the UAV is controlled by an on-board computer to ascend above the target pattern, avoiding collisions with the boat's superstructure. During landing, in some cases, a software module onboard the UAV controls the UAV to descend directly onto the target pattern, landing reliably on the pad with high precision and repeatability.

In some cases, the launch/land system relies on three algorithmic components: detection of a landing target, state estimation and tracking of the landing target and host vessel, and high-precision control of the UAV airframe to execute the launch or landing. In some cases, the softwares and algorithms disclosed herein are capable of running in real-time in a low-size, weight and power (low-SWaP) embedded processor on-board the UAV.

In some cases, the launch/land system may reliably operate in winds up to 20 knots, vessel speeds up to 12 knots, and seas up to 2 meters. The devices, systems and methods herein are configured to automatically secure the UAV within seconds after landing, and automatically release the UAV just before takeoff.

Target Detection

In some cases, disclosed herein is a launch/landing target that uses a unique information-encoded target pattern. Such target pattern is identifiable by one or more sensors of the UAV. For examples, the target may have a unique 2-dimensional pattern preferably with high contrast as shown in FIG. 7.

In some cases, the target may include one or more markers. The markers may also differentiate the mobile platform or a landing target from other objects or regions. The marker may be used as a fiducial marker, which may aid the UAV in navigating to a proper landing position of the mobile platform. In one example, the marker may include an asymmetric image or code that may be discernible by the UAV. The fiducial marker may be indicative of the orientation of mobile platform relative to the UAV. Thus, the UAV may be able to orient itself properly when landing on the mobile platform.

The marker may include a wireless signal being emitted by the mobile platform. Alternatively, IR and/or UV light, radio, or audio signals may be provided by the mobile platform to assist landing.

In some cases, pattern detection algorithms and software that processes live or high-frame rate signal from one or more UAV sensors. For example, the pattern recognition algorithm may process live video from one or more camera on-board the UAV. The UAV camera may be facing downward and may be adjustable to capture the target from different angles. In some cases, software modules disclosed herein achieve fast runtimes on high-definition (HD) imagery, while remaining robust to variations due to lens distortion, shadows, occlusion, glare, and exposure problems, as shown in FIG. 5. Robustness is essential for operations without a pilot in the loop, especially when deployed from unmanned vessels. As a non-limiting example, algorithm/software is used to detect all the line segments of the target and objects near or obstructing part of the target. Based on the detected ling segments, notches are added indicating directionality of the line segments. Afterward, with the a-priori knowledge of the pattern—the pattern is a rectangle or a square, optionally with information of the area of the pattern, the algorithm select and connects the line segments with four corners and missing information filled in.

In some cases, disclosed herein includes algorithm optimizations and hardware acceleration to enable fast target detection in HD imagery on low-SWAP hardware. In some cases, software disclosed herein can operate in real-time onboard a UAV to search for, detect, and track a target pattern at ranges up to 22 meters or 40 meters altitude above the boat deck. In some cases, the target search algorithm currently runs on a 2 GHz multi-core ARM processor at approximately 15 frames per second (fps). Once the target is detected, additional inter-frame information is used to accelerate detection rates to >30 fps, enabling the detector to lock-on to the target during landing operations. In this way, the target detector remains robust to boat motion during the UAV landing.

In some embodiments, the system disclosed herein uses a known visual fiducial on or near the moving charging platform. The drone identifies the visual fiducial and extracts range and state information about it in order to guide the aircraft to a precise landing. In another variant, the drone also uses data, such as IMU data, from the mobile platform to assist in the landing. In yet another variant, the drone and mobile platform use an RF-based localization scheme, such as GPS RTK or ultra-wideband, for purposes of localization. A deployed system may use any or all of these individually or in combination in order to successfully takeoff and land on the mobile platform sufficiently accurately for purposes of energy replenishment. In all cases, the precision guidance, navigation, and control (including landing maneuvers) relative to the moving vessel are a key functional element in the overall recharging method.

The UAV may identify the mobile platform by sensing a marking, for example a marking may be a pattern, an image, a symbol, a decal, a 1-D, 2-D, or 3-D barcode, a QR code, or lights detectable on the mobile platform. For example the marking may be a light or pattern of lights, not necessary visible light, but also infrared or ultraviolet light, the lights may be turned on only when the mobile platform has charging station available.

The precision navigation process may comprise detection and measurement of the 3D location and 3D orientation of the host vehicle and navigation target. Detection may be performed using any of several methods, including optical or infrared (IR), radar, RF beacons, acoustic ranging devices, differential-GPS, and RTK, each having advantages and disadvantages. For example, performing optical detection and measurement may confer the following advantages to the tethered system: high accuracy; 100% passive detection (without emitters or 2-way communication required); low size, weight, power, and cost (SWaP-C); not being affected by RF or acoustic interference; nearly impossible to "spoof"; and minimal installed hardware requirements on the vehicle.

The optical detection system may use a unique information-encoded navigation pattern called a "marker". For example, an optimized pattern detection approach (e.g., algorithm) can be used to process live video from a downward-facing camera of the UAS. The optimized pattern detection approach can be configured to locate the position and orientation of a fiducial marker on processor-constrained hardware. The optimized pattern detection approach may achieve fast runtimes on high-definition (HD) imagery, while remaining robust to variations arising from, for example, lens distortion, shadows, occlusion, glare, and exposure.

Target State Estimation

In some cases, target detections are used by the UAV to update a relative state estimate of the landing pad on the vessel. The state estimate includes target motion (heave, sway, surge, or a combination thereof) in position, velocity, acceleration, and orientation (roll, pitch, yaw, or a combination thereof). In embodiments, the state estimation algorithm enables the UAV to maintain a precise track on the vessel at all times. In further embodiments, the algorithm can predict the vessel state through short periods of detection blackouts, if, for example, the target is momentarily occluded, or the UAV gets blown away from the boat. This feature allows the landing system to recover from environmental anomalies.

The target state estimation may comprise using a Kalman Filter (KF) to maintain an estimate of the navigation target position and velocity. This estimate may also be used to predict the estimated location of the target at future times. The KF may operate in a moving North-East-Down (NED) coordinate system centered at the UAS, which is referred to as the Vehicle-NED or V-NED coordinate frame. The KF state vector may be expressed as the V-NED position and velocity given by: $X=[x_N, x_E, x_D, \dot{x}_N, \dot{x}_E, \dot{x}_D]^T$.

The state evolves with the dynamics of the target relative to the UAS as given by:

$$\dot{X} = AX + BU + W,$$

W~N(0,Q)

in which $$A = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix} \text{ provides}$$

the relative drone-vehicle motion model, $$U = \begin{bmatrix} a_N \\ a_E \\ a_D \end{bmatrix}$$

is acceleration input from the UAS autopilot, with $$B = \begin{bmatrix} 0 & 0 & 0 \\ 0 & 0 & 0 \\ 0 & 0 & 0 \\ -1 & 0 & 0 \\ 0 & -1 & 0 \\ 0 & 0 & -1 \end{bmatrix}$$

and

W is the process noise vector, with $$Q = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & \sigma_N^2 & 0 & 0 \\ 0 & 0 & 0 & 0 & \sigma_E^2 & 0 \\ 0 & 0 & 0 & 0 & 0 & \sigma_D^2 \end{bmatrix}$$

as the process noise covariance matrix.

Data collection may comprise recording measurements by generating landing target detections in the camera's image plane. A "detection" may comprise the detected locations and covariances of the pattern corners, using the following equations:

Locations of pattern corners in image plane pixel coordinates $Z_{pix}^i=[z_x^i, z_y^i]$, i=1, 2, 3, 4

Covariance in Image Plane Pixel Coordinates $$R_{pix}^i = \begin{bmatrix} \sigma_{xx}^i & 0 \\ 0 & \sigma_{yy}^i \end{bmatrix},$$

i=1, 2, 3, 4

Using the camera's intrinsic parameters, detections may be first converted into the camera frame. The resulting camera frame detections may comprise 3D detection locations of the marker corners in the camera frame, and corresponding 3×3 covariance matrices (which are generated using a first-order backwards propagation model), given by:

Locations of pattern corners in image plane pixel coordinates $z^i=[z_x^i, z_y^i, z_z^i]$, i=1, 2, 3, 4

Covariance of Marker Corners in Camera Coordinates $$R^i = \begin{bmatrix} \sigma_{xx}^i & \sigma_{xy}^i & \sigma_{xz}^i \\ \sigma_{yx}^i & \sigma_{yy}^i & \sigma_{yz}^i \\ \sigma_{zx}^i & \sigma_{zy}^i & \sigma_{zz}^i \end{bmatrix}$$

Figure 13:
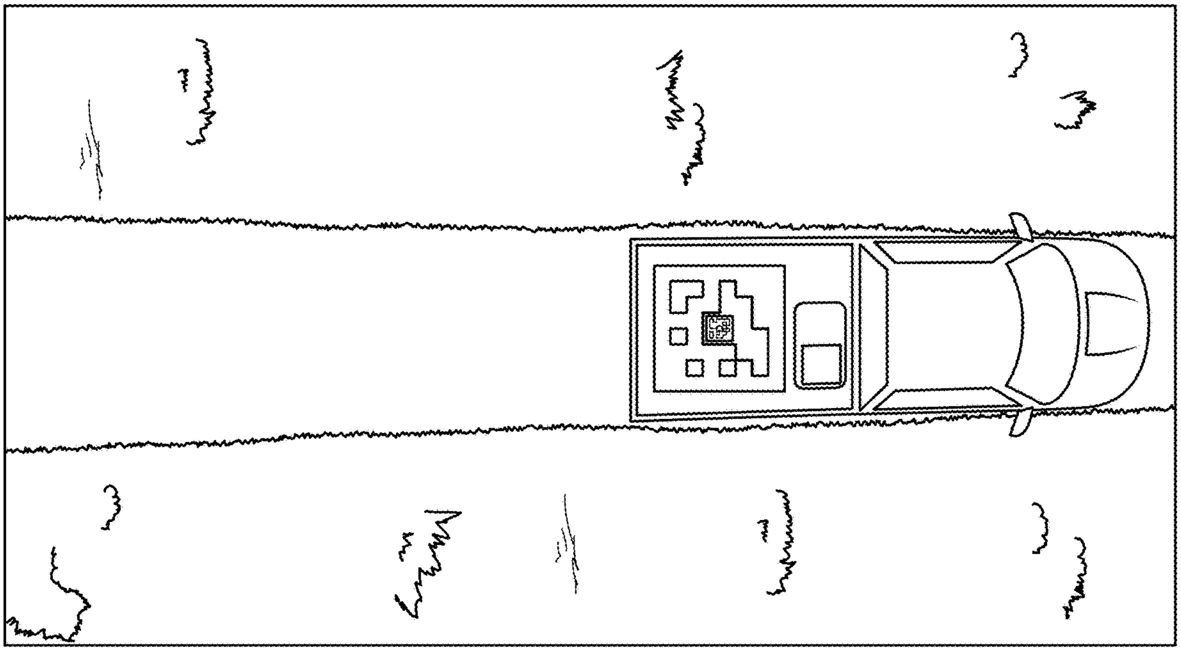
FIG. 13 illustrates a non-limiting example of a precision navigation system using optical measurements to generate and maintain a highly accurate estimate of a vehicle's position, orientation, and velocity, in accordance with some embodiments.

Using the drone state telemetry, camera frame detection data may then be transformed into V-NED for incorporation into the KF. A single marker position measurement may be generated from the four corner measurements using a 3D re-projection of the center of the plane created by those points. The corner points may determine the 3D marker orientation and may also be used in the position measurement covariance calculation. The KF estimate may then be updated with landing target detections using the standard KF update. FIG. 13 illustrates an example of a precision navigation system using optical measurements to generate and maintain a highly accurate estimate of a vehicle's position, orientation, and velocity.

UAV Control

In one variant, the system uses a known visual fiducial on or near the mobile platform. The drone may identify the visual fiducial and extract range and state information about it in order to precisely guide the UAV relative to the mobile platform. In another variant, the drone uses data, such as IMU data, from the mobile platform to assist guidance. In yet another variant, the UAV and mobile platform use an RF-based localization scheme, such as GPS RTK or ultra-wideband, for purposes of localization. In some cases, the UAV uses machine learning, artificial intelligence, or similar algorithm(s) to identify a known target or feature of the mobile platform. The system and method may use any or all of these disclosed herein individually or in combination in order to successfully manage the relative positions of the drone and platform, and therefore tether management. In some cases, the precision guidance, navigation, and control relative to the mobile platform is a key functional element.

The system and method disclosed herein, in some instances, include a nested visual fiducial ("marker") system as shown in FIG. 5. In some cases, visual fiducials herein to provide detection of known landing location that is robust to occlusions, shadows, and lighting conditions. It also may minimize false positives, which can be catastrophic during a landing maneuver. Furthermore, state information (distance, pose, etc) may be extracted visually from the tracking target, which is important for the estimation and control of the UAV.

In some cases, the system and method herein includes a series of nested tracking targets. In further cases, each one of the series of nested tracking targets gradually becomes smaller than the previous one, and are co-centered. When the UAV gets close to the mobile platform, a single tracking target may move out of the field of view of the sensor(s) onboard the UAV. By using nested tracking targets, it may ensure that one or more of the series of nested tracking targets may be within the field of view, even when the aircraft is very close to the tracking target or the mobile platform. The system and method herein may be able to differentiate between the different tracking targets and hand off from one to another seamlessly. In order to do that, in some cases, the middle 4-bits of the tracking target are masked in software (so they aren't attempted to be decoded), which speeds up the detection of the tracking target(s) significantly. The nested tracking target approach is very important especially where the mobile platform continues to move significantly even when the aircraft is close to landing.

The visual fiducial or tracking target may provide a marker on a mobile platform that allows algorithm(s) onboard the UAV, for example, computer vision algorithm(s), to determine relative position, distance, and pose of the mobile platform in a very efficient manner. The tracking targets may be encoded, so that the algorithm does not accidently detect something else as a tracking target. In some cases of using tracking targets to aid in drone precision landing and takeoff operations, a single tracking target is insufficient. This may be because the tracking target of a given size might be good to at a certain range, but too large or small at other ranges. For example, a tracking target that measure 1×1 meters can be readily detected at 20 meters by the camera and algorithm. However, due to the field of view limits of the onboard camera, it may not be detectable at 2 meters. To have detectable tracking targets at all times, until landing, smaller tracking targets may be added within the larger tracking target. For example, a tracking target that measure 10×10 cm may be placed inside of the larger tracking target. This smaller tracking target may not detectable from 20 meters away, but detectable from 2 meters away. Therefore, the algorithm can hand-off from a larger to smaller tracking target and maintain positive detections and different ranges. In some cases, a third smaller tracking target may be used for detections at even closer ranges, around 20 cm. In some embodiments, these tracking targets of decreasing sizes are nested inside one another. This nested tracking target design may have several advantages. One is that they are co-centered, which makes the landing processes smoother. Another advantage may be within the computer vision algorithm itself, because the tracking targets may share the center 4-bits that is masked or encoded for the algorithm to detect and provides a very low false-detection rate. The nested tracking target allows for high-reliability detections at ranges of different orders of magnitude. It may also allow the detection algorithm to automatically mask the center bit shared by multiple tracking targets, so that the smaller nested tracking targets do not interfere with the detection of the larger tracking targets. The algorithm may ignore the smaller tracking targets when decoding the larger tracking target.

Figure 8:
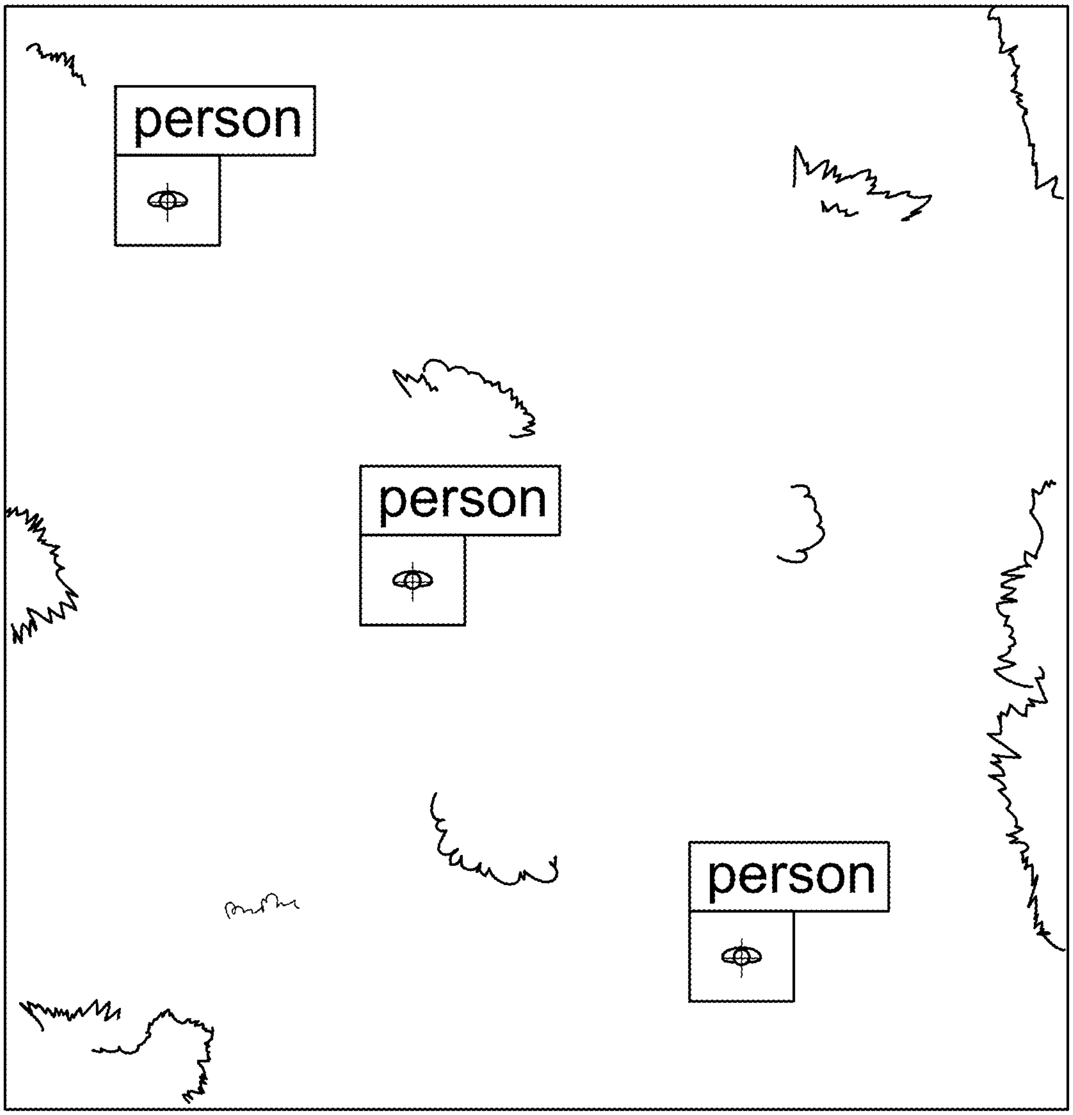
FIG. 8 is an image of targets being tracked by a neural network based object detection and localization platform.

FIG. 8 is an image of targets being tracked by a neural network based object detection and localization platform. Additionally, per FIG. 8, the digital processing device of the mobile platform may further comprise a neural network-based object detection, classification (human, vehicle, mammal, etc.), and localization platform to assist in sensor exploitation by automating tedious detection and tracking tasks for a wide range of EO and IR payloads. The digital processing device may comprise an on-board computing and control module, including one or more of: a flight controller, a high-performance embedded computer (e.g., NVIDIA TX2), payload interfaces, and power distribution. It can be configured to process 4K or higher resolution images at frame rates of at least 30 fps. All hardware interfaces may be open, industry standards (e.g., HDMI, MIPI, and USB), and may use open-source data and messaging formats (e.g., cursor-on-target, MAVLINK). The system may be designed to provide sensor modularity and extensibility.

In some cases, the systems and methods herein may have the ability to dynamically change the size of one or more tracking targets to increase the detection range and improve the measurement capability during landing. The size of the tracking target can be dynamically changed in several ways. As a non-limiting example, the tracking target can be projected onto a surface, optionally on the mobile platform. Based on the height of the UAV, the projected tracking target may increase or decreased in size. For given camera parameters (field of view, resolution, focal length), a tracking target of a given size may be detected at a relatively short distance during landing. For example, a 1 meter tracking target (along its largest dimension, length, width, or diagonal) with a typical camera set up would be detectable at 20 meters away from the camera. In order for the tracking target to be detectable at 100 meters, either the camera changes (including zooming) or the tracking target increase in size, or both. There can be many issues with relying on the camera to properly zoom in and out, so the focus is changing the size of the tracking target. Not only can the tracking target get larger to be detectable at a longer range from the UAV, but it may also get smaller as the UAV gets closer so that it can continue to track the tracking target at close range in the field of view.

In some cases, an electronic screen may display a tracking target and change the actual size of that tracking target based on the range of the UAV to the mobile platform. In other cases, a projector projects the tracking target onto a flat surface, and actively changes the size of the projection. In other cases, a mechanical device may expand or contract the size of the tracking target.

The tracking targets disclosed herein, especially the nested tracking targets and the dynamically changing tracking targets may increase the range of detections dynamically. For example, if a ship has a very large superstructure that is 100 meters high, a very large tracking target may be needed for the drone to be able to detect the ship while avoiding the superstructure. But as the drone descends, the size of the tracking target may have to change so that it can stay within the field of the view of the camera of the UAV.

In some cases, to ensure safe, accurate, and robust autonomous takeoff and landing UAV operation from a moving vessel, an algorithm or software controls the UAV based on the state estimation of the target to safely achieve the desired operation (takeoff or landing). In some cases, the algorithm accounts for motion of the vessel during takeoff and landing, ensuring high performances and robustness of the system. In some cases, the algorithm or software that controls the UAV is onboard the UAV. In other cases, the algorithm or software is onboard the UGV or USV but controls the UAV via communication between the UAV and the USV or UGV.

In some cases, the launch/landing system is designed such that the UAV on-board processor acts as an "outer-loop" controller by determining the UAV state actuation (roll, pitch, yaw, and thrust) required to achieve the desired UAV motion. The on-board computer communicates control commands directly to the UAV autopilot, which performs the "inner-loop" control to execute those commands with speed control of the propellers.

Figure 14:
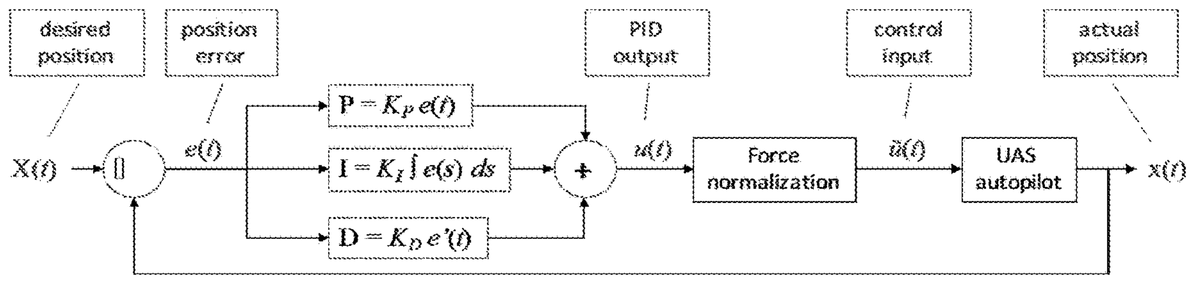
FIG. 14 illustrates a non-limiting example of a Proportional-Integral-Derivative (PID) algorithm to command the UAS during precision navigation, in accordance with some embodiments.
Figure 15:
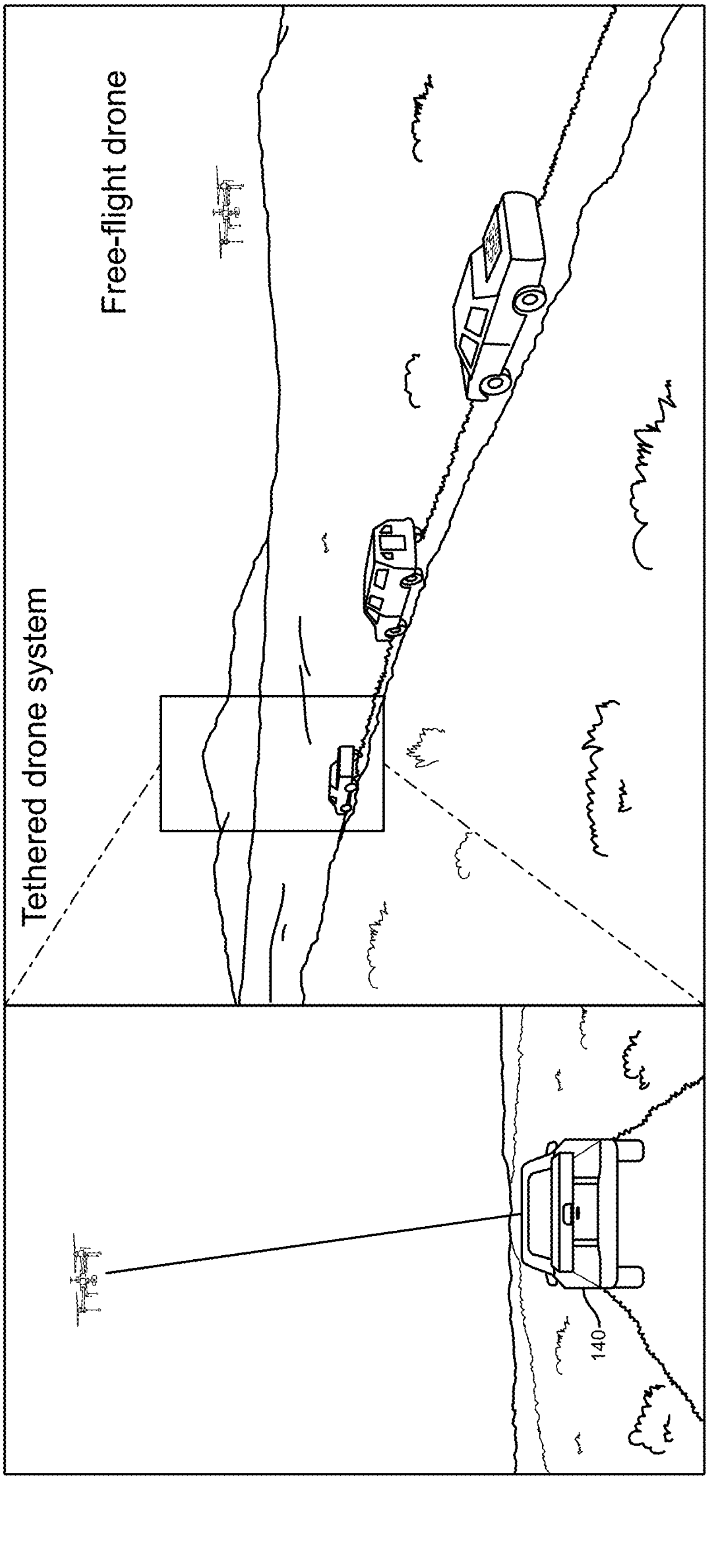
FIG. 15 illustrates a non-limiting example of a precision navigation system controlling drones autonomously, maintaining precise relative position for moving convoy aerial support operations, in accordance with some embodiments.

The navigation system may use a Proportional-Integral-Derivative (PID) algorithm to command the UAS during precision navigation, as shown in FIG. 14. For example, the PID loop may control the North and East UAS motion, while a separate descent logic controls the altitude and vertical motion of the drone. A desired position for the navigation target in relative NE coordinates may be fed to the controller as the desired position X(t). From the desired input position, a position error may be calculated in Euclidian coordinate space. From this error, the Principal, Integral, and Derivative control inputs may be derived. The PID gains $K_P$, $K_I$, and $K_D$ may be dynamically scaled, based on the drone's altitude over the target. When the UAS is higher above the target, lower PID gains may be used, to tolerate rapid changes in relative state between ground vehicle and aircraft. As the UAS descends closer to the target, the target position measurement may become more accurate. Higher PID gains may be used in this regime to enable tighter target tracking. This "gain scaling" approach may enable the system to generate fast, accurate, and stable UAS response in a full range of operational altitudes, without overshoot of oscillation. The output of the PID loop may be a force normalized by the mass of the drone. This force-to-mass ratio may be transformed into attitude angle commands (roll & pitch) according to a non-linear equation that relates drone attitude to force generated. FIG. 15 illustrates an example of a precision navigation system controlling drones autonomously, maintaining precise relative position for moving convoy aerial support operations.

In cases where the algorithm or software is not onboard the UAV, various communication modes may be utilized between the UAV and the mobile platform. In some cases, such communication modes control the UAV and receive data from the USV or UGV, and transmit data to the USV or UGV.

The UAV may take off and land on the USV vertically. Wireless communication between the UAV and the USV or UGV may be used to get the UAV to the general location of the mobile platform. The UAV may employ GPS or other locating software to identify the USV or UGV. The GPS or other location techniques can be used to get the UAV to the vicinity of the USV or UGV. The wireless communications may get the UAV within range to sense one or more portions of the USV or UGV. As shown in FIG. 6, for instance, the UAV may be brought into a line-of-sight of the mobile platform. The landing target may aid in further pinpointing the location of the mobile platform. In some cases, one or multiple marker may serve as a confirmation of the landing target of the mobile platform on which the UAV may land. The markers may also differentiate the mobile platform or a landing target from other objects or regions.

The marker may be used as a fiducial marker, which may aid the UAV in navigating to a proper landing position of the mobile platform. In one example, the marker may include an asymmetric image or code that may be discernible by the UAV. The fiducial marker may be indicative of the orientation of mobile platform relative to the UAV. Thus, the UAV may be able to orient itself properly when landing on the mobile platform. The marker may also be indicative of the distance relative to the UAV. This may be used separate from or in combination with one or more other sensors of the UAV to determine the altitude of the UAV. This altitude determination may be vital to ensure altitude accuracy, which is absent from most GPS data.

In some examples, multiple markers may be provided. The desired landing target may fall between the multiple markers. The UAV may use the markers to help orient the UAV and/or position its landing between the markers. Distance between the markers may aid the UAV in gaging the distance of the UAV to the landing area.

The marker may include a wireless signal being emitted by the mobile platform. Alternatively, IR and/or UV light, radio, or audio signals may be provided by the mobile platform to assist landing.

The system may be configured to perform night operations, which may require some level of illumination of the fiducial marker on the ground vehicle. The illumination may be in the visible or infrared spectrum. The illumination may be backlighting from the landing pad itself, from illuminators on ground vehicle, or potentially from the aircraft. Intense illumination may not be required. Illumination may be only be detectable by the aircraft camera with suitable dynamic range, including operating in low-light conditions. The choice of placement and type of illumination can be determined based on the specific operating conditions of the UAS system.

Relative Navigation (Station-Keeping)

The precision navigation system may enable safe and reliable tethered drone operations from moving vehicles by automating any or all of the three phases of mobile tethered operations: (a) precision launch, (b) relative navigation (e.g., "station-keeping"), and (c) precision landing. Station-keeping may refer to the ability of the drone to maintain a fixed position (offset) relative to a moving vehicle. Performing station-keeping may be critically important for mobile tethered drone operations because it enables the drone to move with the vehicle. Further, station-keeping enables the tether length (payout) to remain constant. This dramatically simplifies the tether spooling process, increases the lifespan of the drone and tether, and reduces energy consumption. The tethered system may use onboard vision processing to provide precise 3-dimensional (3-D) station-keeping relative to a moving ground vehicle or small boat. This enables the UAS to launch and recover while the host vehicle is in motion, and provides a reliable, secure navigation solution to the UAS, while maintaining freedom of movement for the host vehicle. Such station-keeping may be performed in real-time to meet mission needs (e.g., ISR capabilities). Since it is a vision-based positioning system, it may be configured to not require GPS or any RF emitters. Command and Control (C2), video, and power may be transmitted via tether, such that radios are not required.

The station-keeping system may allow the UAS operator to exert precise control over the position of the drone relative to the vehicle. A desired drone operating position can be input to the system by the operator, through a web user-interface (UI). By default, an input position of (0,0) may be configured to position the drone directly over the vehicle's navigation target; this is the position input that is used during takeoff and landing. Alternatively, the operator can input an offset desired position relative to North, or relative to the moving vehicle. For example, the system can maintain the drone position a constant distance (e.g., about 1 m, about 2 m, about 3 m, about 5 m, about 10 m, about 20 m, about 30 m, about 40 m, about 50 m, about 100 m) at a certain direction (e.g., directly above, north, south, east, west, left, right, ahead, or behind) relative to the vehicle during the UAS flight.

Figure 16:
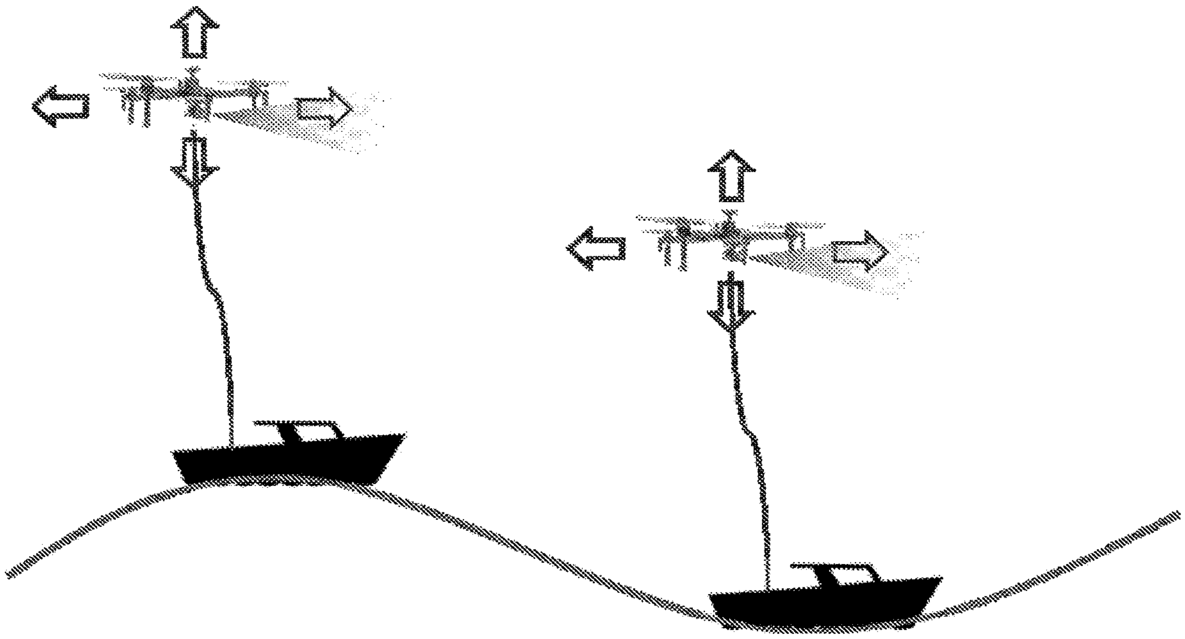
FIG. 16 illustrates a non-limiting example of a precision navigation system automating station-keeping of the drone relative to a moving vessel as the host vehicle, in accordance with some embodiments.

As shown in FIG. 16, the precision navigation system can automate station-keeping of the drone relative to a moving vessel as the host vehicle. For example, the system allows the UAS operator to input a 3-dimensional (3-D) offset desired position relative to the moving vessel, and to maintain the drone position relative to the moving vessel during the UAS flight.

The precision navigation system can perform heave compensation, in which the tether system automatically compensates for motion of the host vehicle, including the heave of a ship. For example, the aircraft can be configured to stay at a fixed altitude even as the host vehicle (such as a boat) moves up and down below it (heaves). Alternatively, as another example, the aircraft can stay at a fixed height above the host vehicle, such that aircraft ascends or descends as the host vehicle moves up and down.

Figure 17:
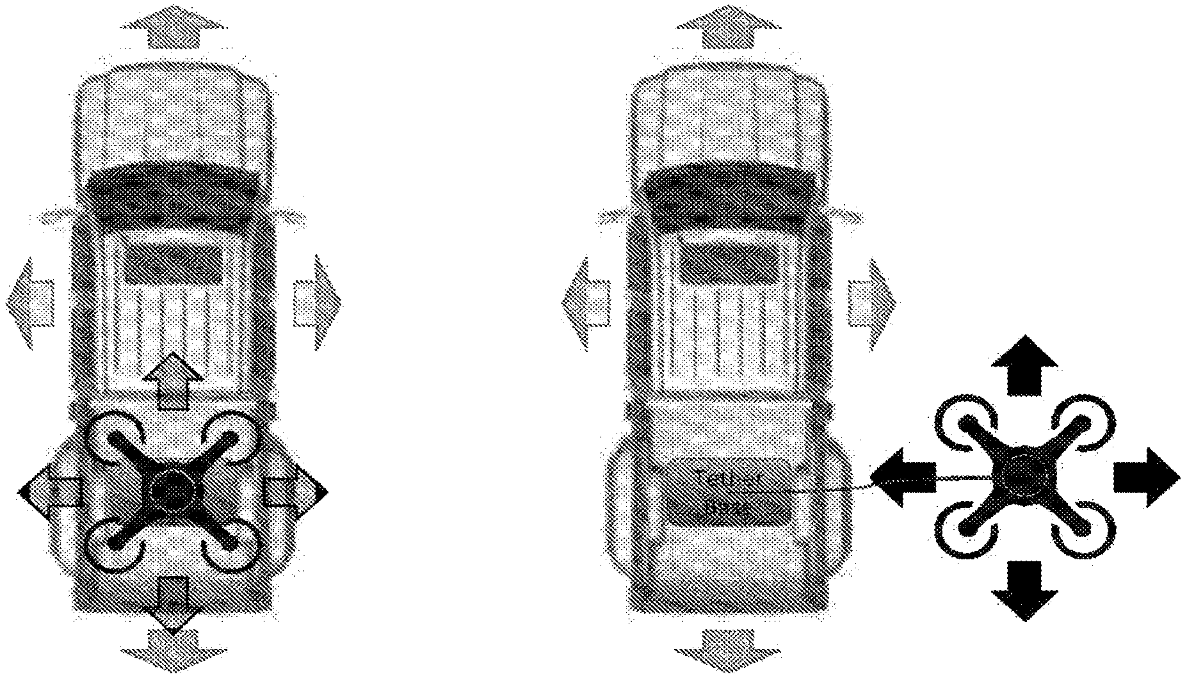
FIG. 17 illustrates a non-limiting example of a precision navigation system automating station-keeping of the drone relative to a moving vehicle as the host vehicle, in accordance with some embodiments.

As shown in FIG. 17, the precision navigation system can automate station-keeping of the drone relative to a moving vehicle as the host vehicle. For example, the system allows the UAS operator to input an offset desired position relative to North, or relative to the moving vehicle, and to maintain the drone position 20 meters to the left of the vehicle during the UAS flight.

Tether Management

The tether base may be configured to automatically adjust the tether tension by paying out (e.g., releasing and extending the tether length, thereby reducing tether tension) and reeling in (e.g., the tether cable. This may not be a one-time function, but actually happens continuously throughout the entire airborne mission. This continuous adjustment may be required due to small movements of the UAS relative to the tether base, caused by wind, turbulence, or poor navigation station keeping. For example, tether length may be actively managed to mitigate "whip" induced when operating from a moving vehicle. Indeed, typical GPS navigation error is 2 to 3 times worse in the vertical dimension than in the horizontal dimensions, so it may be common for UAS altitude error to be several meters or more, and vary throughout the flight.

The constant paying out and reeling in of the tethered cable caused by relative motion between the UAS and host vehicle can generate poor performance for the overall system, and the system may be configured to minimize this whenever possible. For example, spooling of the tether reel may generate extra heat and wear on the tether base. It can also generate instability in the aircraft flight if it is not perfectly synchronized with the aircraft. For example, if there is a delay between an altitude change in the aircraft and the tether reel response, this can put the aircraft guidance system in a regime where it is fighting against the tethered tensioning system.

The optical guidance system may be configured to generate an exceptionally accurate vertical position estimate of the UAS above the tether base—up to 1 to 2 orders of magnitude better then GPS. Furthermore, the control system may be tuned for precise relative position navigation. These benefits may work together to enable the UAS to maintain a highly accurate and constant vertical distance from the vehicle, even as the vehicle moves up and down—for example, a truck driving over hills, or a vessel heaving in high seas. The constant relative vertical position allows the tether base to maintain a constant amount of tether paid out, thereby minimizing the issues described above.

Securing Mechanism (Launch and Recovery System)

Figure 18:
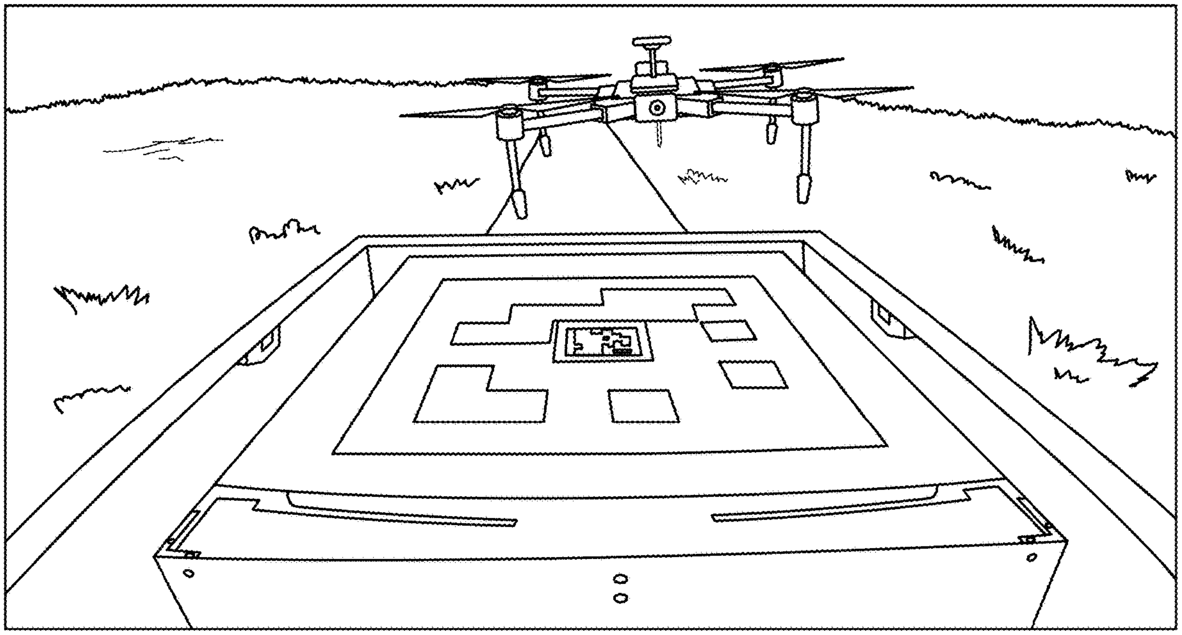
FIG. 18 illustrates a non-limiting example of a launch and recovery system (LARS), which may be an actuated pad that releases the UAS immediately before takeoff, and captures the UAS immediately after landing, and secures the UAS to a vehicle or vessel while it is not in flight, in accordance with some embodiments.

The system may comprise a launch and recovery system (LARS) that enables the application of the tethered UAS system in severe off-road terrain, from a variety of ground vehicles. The LARS may have three primary functions: physical securing of the aircraft onto the ground vehicle—both prior to flight, and immediately after landing; re-centering the aircraft after landing, to prepare for the next takeoff; and housing and providing interfaces for all ground electronics. As shown in FIG. 18, the LARS may be an actuated pad that releases the UAS immediately before takeoff, and captures the UAS immediately after landing, and secures the UAS to a vehicle or vessel while it is not in flight. Additionally, the LARS may contain the optical target that the aircraft uses for guidance and navigation. The LARS design may be configured to be adaptable to a wide variety of ground vehicles, such as operation in high-vibration environments (e.g., in the bed of a pickup, or secured to the roll cage of a tactical vehicle). The tether can be integrated into the landing pad, which can include the LARS securing device for the aircraft and a power and data interface to the host vehicle.

Figure 19:
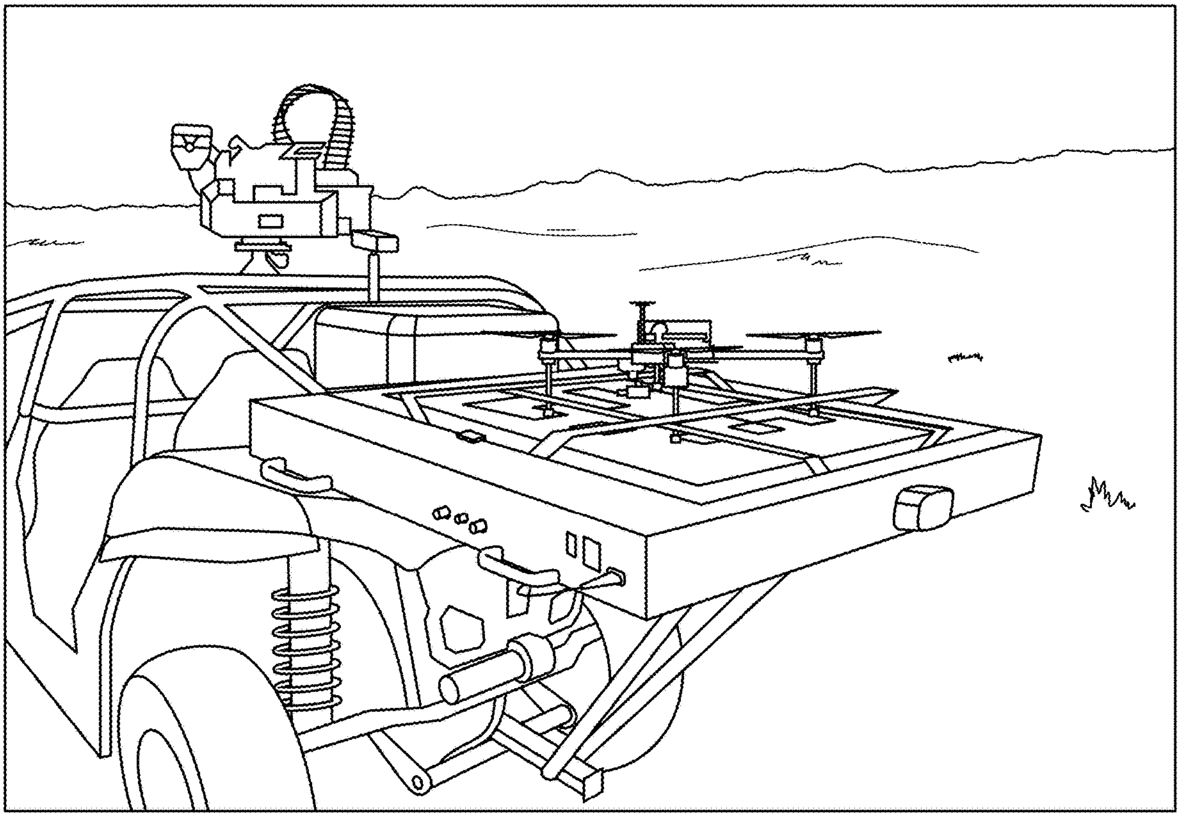
FIG. 19 illustrates a non-limiting example of a LARS installed on a UTV, with the aircraft secured and the LARS in the closed position, in accordance with some embodiments.

The LARS may have a welded aluminum frame structure, suitably dimensioned (e.g., about 4 ft.×5 ft.×9 in., which provides a rigid structure for the device, as well as secure mounting points for attachment to a roll cage or vehicle body. Optionally, the handles can serve as tie-down points for temporary installation via ratchet straps. The securing system may use two electrical servo-motors to drive opposing gantry bars, which are housed inside the frame. These gantry bars may move inward (closed position) and outward (open position) via lead screws commanded by the servo-motors. Affixed to the gantry bars may be crossbars, which protrude above the landing surface to interface with the UAS. The LARS may be customized to the application and specifications of the tethered UAS system. FIG. 19 illustrates an example of a LARS installed on a UTV, with the aircraft secured and the LARS in the closed position.

Figure 20:
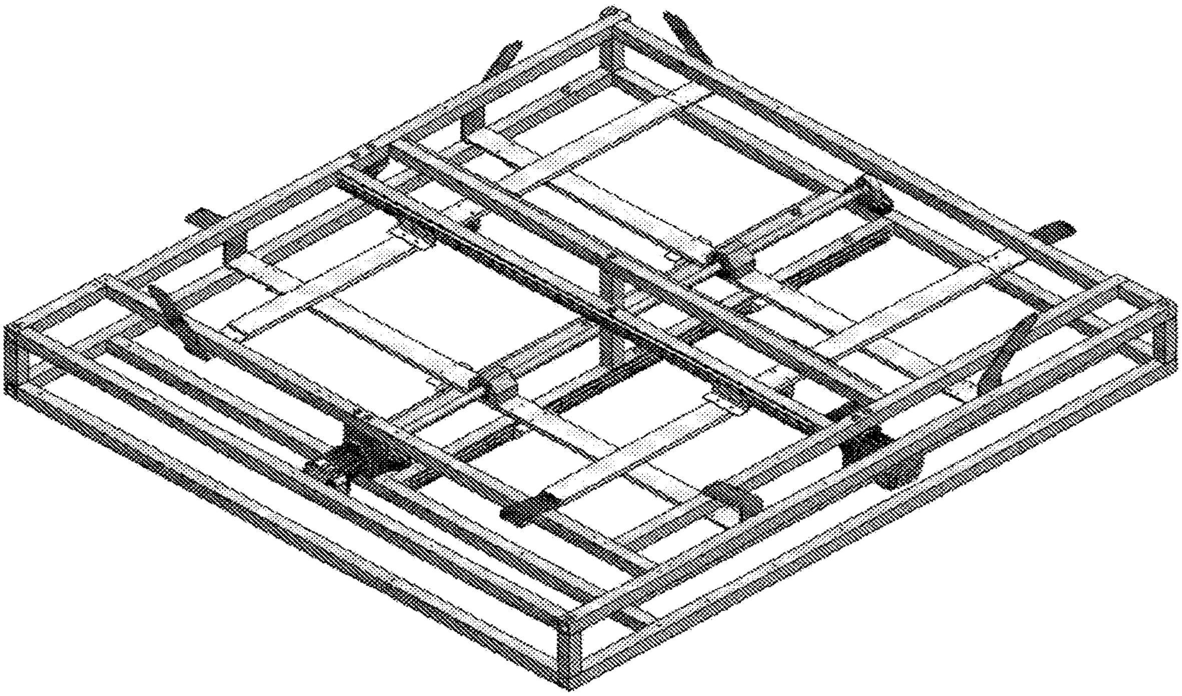
FIG. 20 illustrates a non-limiting example of LARS internal components, including motors, lead screws, and gantry bars, in accordance with some embodiments.

The LARS device may be fully autonomous, such that capture and release operation may be triggered automatically by the UAS flight control system. Prior to takeoff, the aircraft may be positioned in the center of the landing surface, and four crossbars may secure the aircraft onto the LARS. When the aircraft is armed, a command signal may be sent to the LARS electronics, which actuates the LARS, and the crossbars may drive to the open position. The aircraft may then take off, and the LARS may remain in the open position during flight. Immediately upon landing, the aircraft may sense the landing and disarm itself, thereby shutting down the motors. The disarm command may be sent to the LARS electronics, and the crossbars may be commanded to close. Once the LARS is closed, the aircraft may be secured onto the vehicle and centered on the landing surface, ready for the next flight. The LARS may open (and close) quickly (e.g., in less than about 10 seconds, less than about 5 seconds, less than about 4 seconds, less than about 3 seconds, less than about 2 seconds, or less than about 1 second). The LARS system may be configured to operate in an off-road environment, and the aircraft may be configured to remain secure at high speeds, such as about 20 mph, about 25 mph, about 30 mph, about 35 mph, about 40 mph, about 45 mph, about 50 mph, about 55 mph, about 60 mph, about 65 mph, about 70 mph, about 75 mph, or about 80 mph, over rough, off-road terrain (e.g., bumpy dirt roads). FIG. 20 illustrates an example of LARS internal components, including motors, lead screws, and gantry bars.

The LARS may be a fully self-contained unit. It may include an internal battery bank that provides power to the mechanical components (servo-motors) and the electronics. The electronic components of the system may include one or more of: a single-board Linux computer, an Ethernet switch, and a battery charger. The system may be configured to operate on an internal battery for up to about 1 hour, about 2 hours, about 3 hours, about 4 hours, about 5 hours, about 6 hours, about 8 hours, about 10 hours, about 12 hours, about 14 hours, about 16 hours, about 18 hours, about 20 hours, about 22 hours, or about 24 hours, not including tether power (depending on duty-cycle and temperature), and interfaced with power from the ground vehicle. The LARS may also contain the ground side of the digital data link to the aircraft. In a tethered configuration, this digital data link may be removed, routing all communication to the aircraft via the tether.

The LARS system may be designed to provide environmental tolerance. All electronics may be housed inside the frame and isolated from the mechanical components. Weather stripping along the openings may be used to minimize water and dust intrusion into the moving parts. The outer panels of the LARS may be designed for impact resistance and heat mitigation.

Tether Break-Away System

Figure 21:
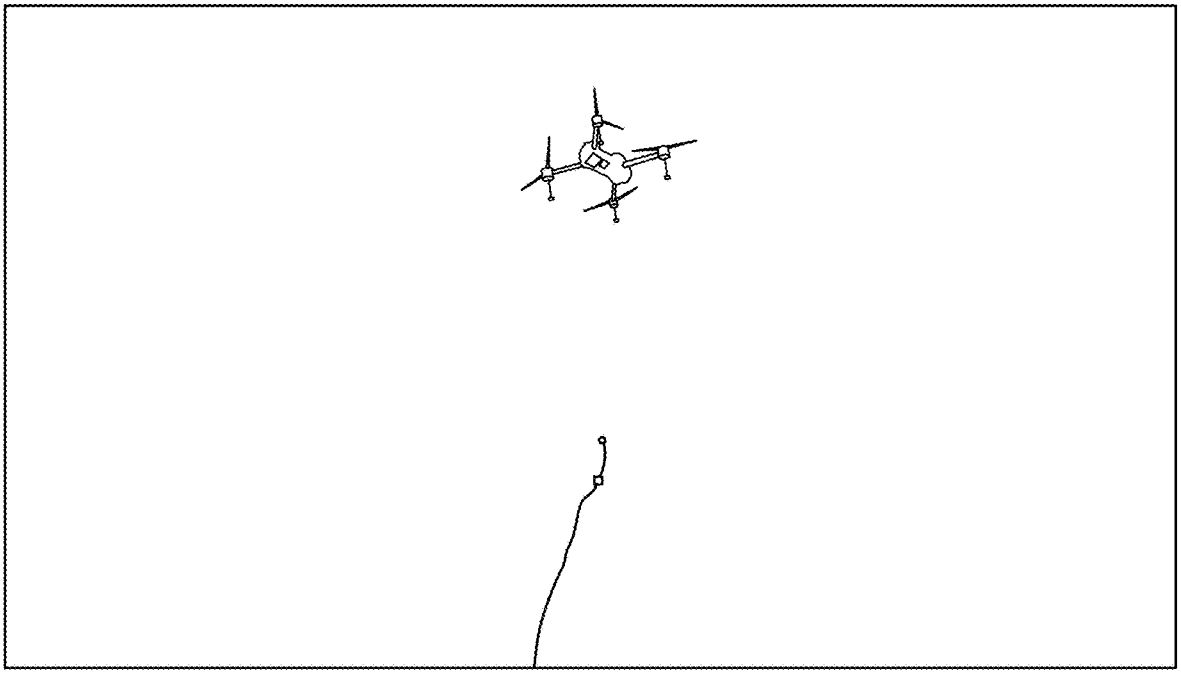
FIG. 21 illustrates a non-limiting example of a tether break-away system, which enables a tethered UAS to drop its tether and transition to battery power for free-flight operation, in accordance with some embodiments.

The system may comprise a tether break-away system. This system may be configured to enable a tethered UAS to optionally release its tether cable and transition to battery-powered free flight. The break-away system may provide an additional layer of mobility for tethered UAS, by allowing them to separate from their base station to provide remote ISR. FIG. 21 illustrates a non-limiting example of a tether break-away system, which enables a tethered UAS to drop its tether and transition to battery power for free-flight operation, in accordance with some embodiments.

The tether break-away system may comprise a release mechanism and a power-switching circuit. In some embodiments, the release mechanism may comprise a mechatronic device that attaches the tether cable to the UAS. It can be triggered from the tether base to release the tether cable from the UAS. In some embodiments, the power-switching circuit is configured to instantly switch the UAS power supply from the tether to on-board batteries, without interrupting the motors. It also shuts off power in the tether cable. At the end of its battery life, the UAS may be configured to autonomously return to its launch pad and execute an autonomous precision landing onto the launch pad.

Communications

In some cases, the proposed UAV-USV autonomous system communicates between the UAV and USV, and between the heterogeneous unmanned team and a remote device or human user.

Communication links between a UAV and its base station are well established. When the base station is mobile, this link must be modified so that the base station can continually transmit updated location (and possibly orientation) information to the UAV. In some cases, a communications module (a "commbox") is mounted on the USV to perform communication tasks. In some embodiments, the commbox includes a GPS and radio link to the UAV. In further embodiments, the commbox receives and logs UAV sensor data (high resolution imagery, video, IR, LIDAR, etc.) and UAV state telemetry.

Communication networks between a USV and a remote operator are well established. Larger USVs typically carry SATCOM or 4G radios for long-range communications supporting remote operations. These vessels can be interfaced with and controlled by an operator located thousands of miles away.

The disclosed communication system may bridge the UAV and USV networks so that data can be seamlessly transferred between them, and efficiently interfaced to a remote device or user. In some cases, the UAV commbox may be mounted on the USV, and linked in to the USV network, for example, SATCOM network. In other cases, the commbox functionality may be added into the existing USV onboard computer, to improve reliability and reduce USV on-board hardware. Either should allow the UAV to share mission data and telemetry with the USV, enabling automated synergistic behaviors between the two vehicles. Remote users could plan and execute UAV missions, as well as retrieve mission data either in real time or upon request.

The UAV may communicate with a USV or UGV. For example, the UAV may transmit information to the USV or UAV regarding the state of the battery on board the UAV, the current flight conditions, time or distance remaining on current mission, battery specifications, battery temperature, UAV specifications, or flight plan. In the case of low battery charge, the UAV may be directed to land at the USV or UGV. If the charge of the battery is too low to permit the UAV to meet the UAV's time or distance remaining on the UAV's current mission, or the UAV flight plan, the UAV may be directed to land at the mobile platform. Optionally, the UAV may be directed to land at the mobile platform if the state of charge of the battery falls beneath a predetermined threshold.

Coordinated Control

In particular embodiments, for true autonomy, the individual vehicles, and overall system accept not just command inputs but high-level command intents, and make internal decision on the best course to achieve those goals. Coordinated control for homogeneous robotic teams is well studied, but heterogeneous teams are more complex to deploy, control, and maintain. In some cases, Control objectives need to optimize a shared goal while exploiting the unique capabilities of each platform.

For the automated inspection purpose, for instances, control scheme that utilizes the USV as a ferry, to transport the UAV to each inspection site may be used. When the USV comes close to a wind turbine or other inspection structure, a message is sent to the UAV to launch and begin the inspection process. The USV may then maneuver to a different location for the eventual rendezvous and landing of the UAV to maximize the overall efficiency of inspecting multiple turbines.

Sensors

In some cases, the system or method disclosed herein includes one or more sensors onboard a UAV, or any other unmanned vehicle. Example of sensors may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, LIDAR, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, GoogleTV®, Google Chromecast®, Amazon Fire®, and Samsung® HomeSync®. Those of skill in the art will also recognize that suitable video game console operating systems include, by way of non-limiting examples, Sony® P53®, Sony® PS4°, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 10:
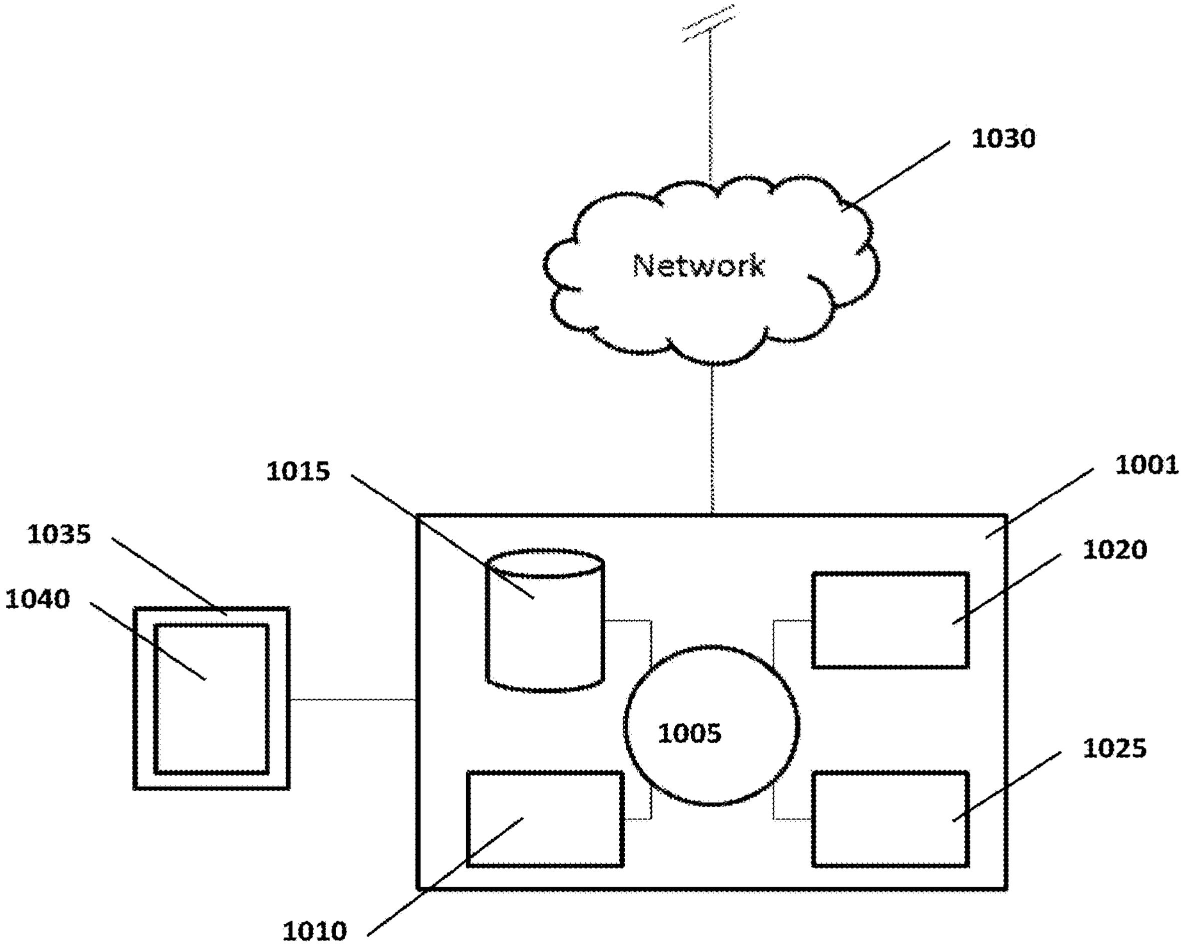
FIG. 10 shows a non-limiting schematic diagram of a digital processing device; in this case, a device with one or more CPUs, a memory, a communication interface, and a display, in accordance with some embodiments.

Referring to FIG. 10, in a particular embodiment, a digital processing device 1001 is programmed or otherwise configured to create a tethered landing application. The device 1001 is programmed or otherwise configured to create a tethered landing application. In this embodiment, the digital processing device 1001 includes a central processing unit (CPU, also "processor" and "computer processor" herein) 1005, which is optionally a single core, a multi core processor, or a plurality of processors for parallel processing. The digital processing device 1001 also includes memory or memory location 1012 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1012, storage unit 1015, interface 1020 and peripheral devices 1025 are in communication with the CPU 1005 through a communication bus (solid lines), such as a motherboard. The storage unit 1015 comprises a data storage unit (or data repository) for storing data. The digital processing device 1001 is optionally operatively coupled to a computer network ("network") 1030 with the aid of the communication interface 1020. The network 1030, in various cases, is the internet, an internet, and/or extranet, or an intranet and/or extranet that is in communication with the internet. The network 1030, in some cases, is a telecommunication and/or data network. The network 1030 optionally includes one or more computer servers, which enable distributed computing, such as cloud computing. The network 1030, in some cases, with the aid of the device 1001, implements a peer-to-peer network, which enables devices coupled to the device 1001 to behave as a client or a server.

Continuing to refer to FIG. 10, the CPU 1005 is configured to execute a sequence of machine-readable instructions, embodied in a program, application, and/or software. The instructions are optionally stored in a memory location, such as the memory 1012. The instructions are directed to the CPU 125, which subsequently program or otherwise configure the CPU 1005 to implement methods of the present disclosure. Examples of operations performed by the CPU 1005 include fetch, decode, execute, and write back. The CPU 1005 is, in some cases, part of a circuit, such as an integrated circuit. One or more other components of the device 1001 are optionally included in the circuit. In some cases, the circuit is an application specific integrated circuit (ASIC) or a field programmable gate array (FPGA).

Continuing to refer to FIG. 10, the storage unit 1015 optionally stores files, such as drivers, libraries and saved programs. The storage unit 1015 optionally stores user data, e.g., user preferences and user programs. The digital processing device 1001, in some cases, includes one or more additional data storage units that are external, such as located on a remote server that is in communication through an intranet or the internet.

Continuing to refer to FIG. 10, the digital processing device 1001 optionally communicates with one or more remote computer systems through the network 1030. For instance, the device 1001 optionally communicates with a remote computer system of a user. Examples of remote computer systems include personal computers (e.g., portable PC), slate or tablet PCs (e.g., Apple iPad, Samsung Galaxy Tab, etc.), smartphones (e.g., Apple iPhone, Android-enabled device, Blackberry®, etc.), or personal digital assistants.

Methods as described herein are optionally implemented by way of machine (e.g., computer processor) executable code stored on an electronic storage location of the digital processing device 121, such as, for example, on the memory 1012 or electronic storage unit 1015. The machine executable or machine readable code is optionally provided in the form of software. During use, the code is executed by the processor 1005. In some cases, the code is retrieved from the storage unit 1015 and stored on the memory 1012 for ready access by the processor 1005. In some situations, the electronic storage unit 1015 is precluded, and machine-executable instructions are stored on the memory 1012.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 11:
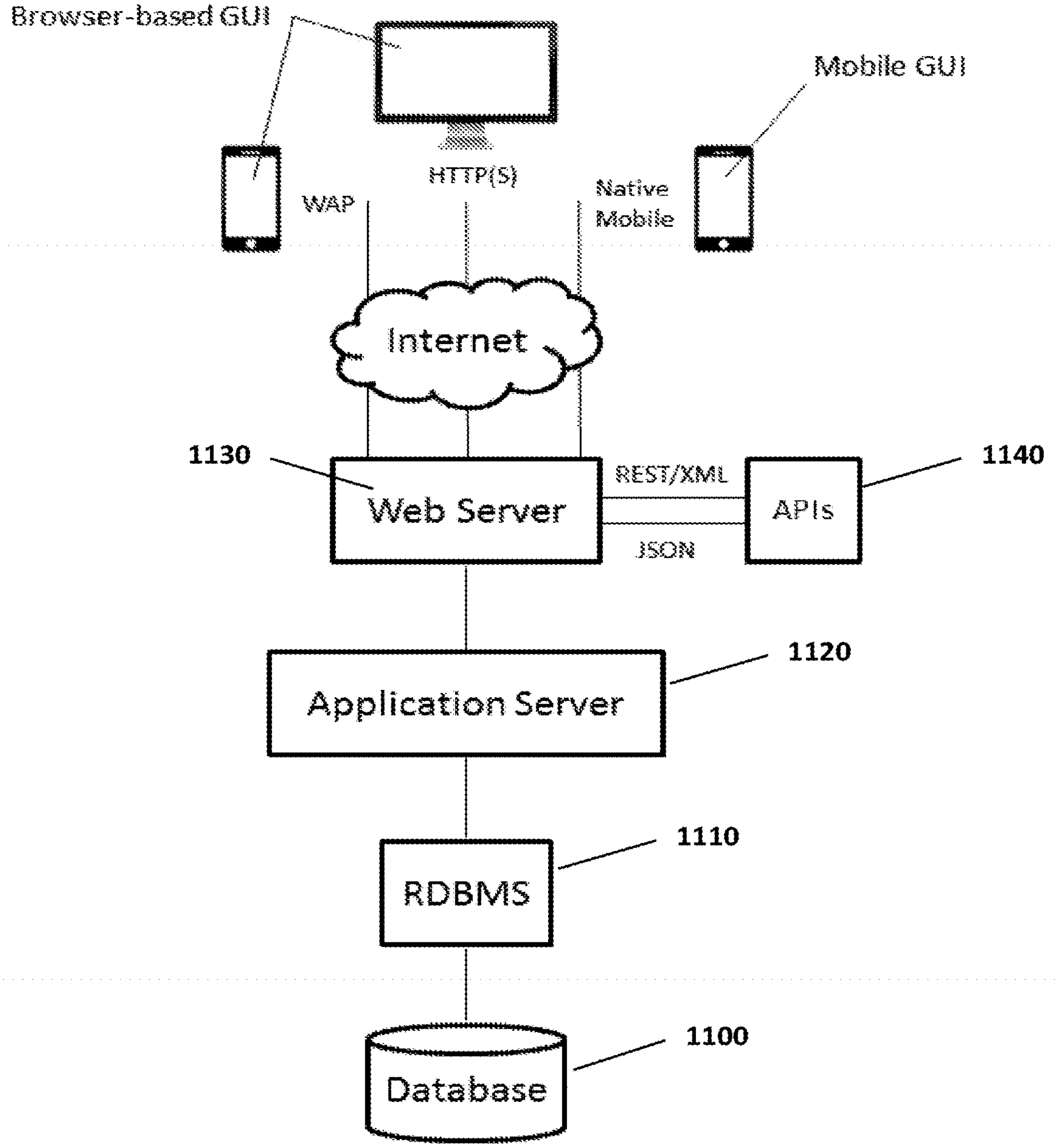
FIG. 11 shows a non-limiting schematic diagram of a web/mobile application provision system; in this case, a system providing browser-based and/or native mobile user interfaces, in accordance with some embodiments.

Referring to FIG. 11, in a particular embodiment, an application provision system comprises one or more databases 1100 accessed by a relational database management system (RDBMS) 1112. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1120 (such as Java servers, NET servers, PHP servers, and the like) and one or more web servers 1130 (such as Apache, IIS, GWS and the like). The web server(s) optionally expose one or more web services via app application programming interfaces (APIs) 1140. Via a network, such as the internet, the system provides browser-based and/or mobile native user interfaces.

Figure 12:
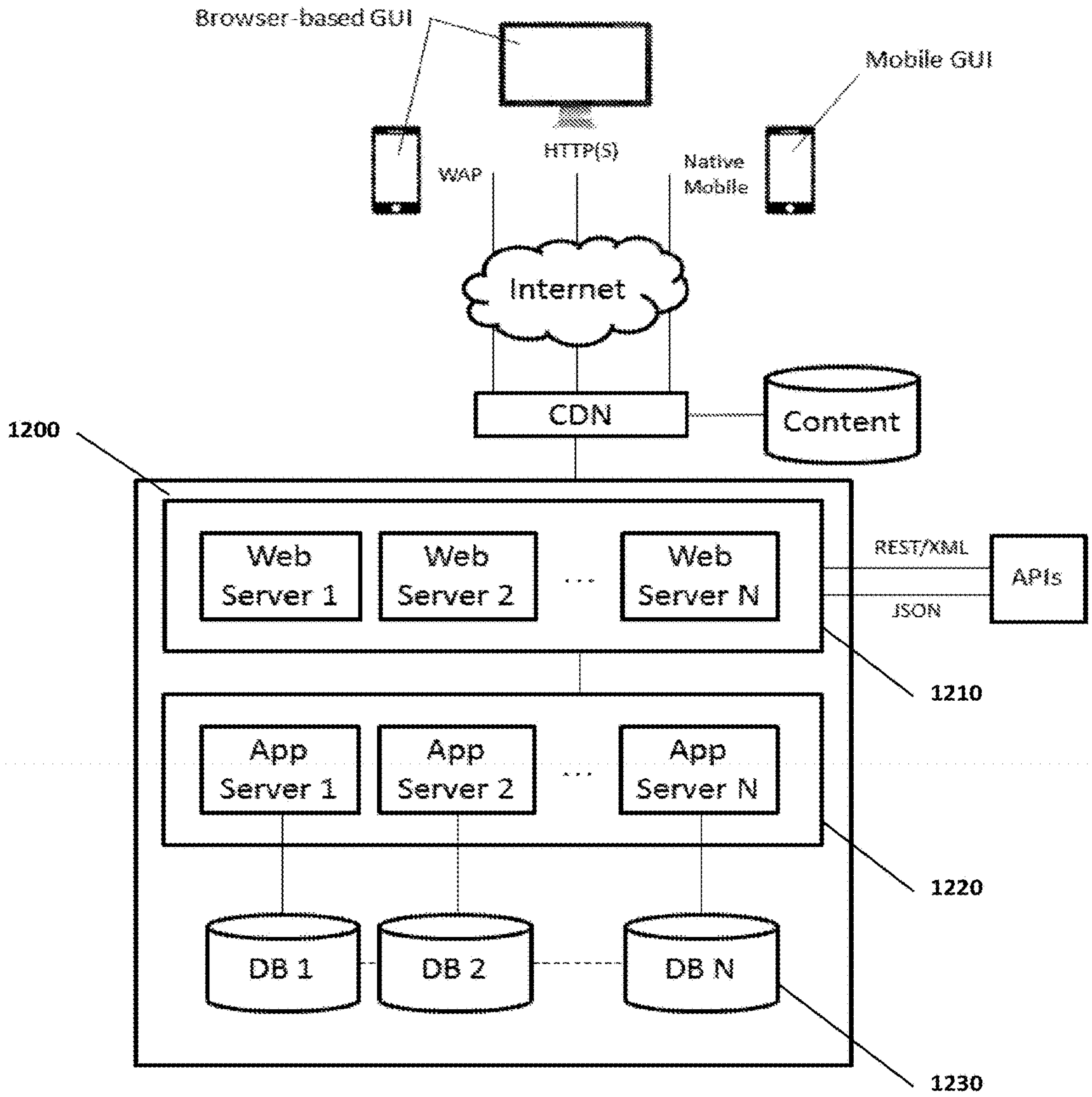
FIG. 12 shows a non-limiting schematic diagram of a cloud-based web/mobile application provision system; in this case, a system comprising an elastically load balanced, auto-scaling web server and application server resources as well synchronously replicated databases, in accordance with some embodiments.

Referring to FIG. 12, in a particular embodiment, an application provision system alternatively has a distributed, cloud-based architecture 1200 and comprises elastically load balanced, auto-scaling web server resources 1212 and application server resources 1220 as well synchronously replicated databases 1230.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appeelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for creating a tethered landing application. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

Example 1

In a particular case, a small boat is far offshore, but desire to have long range communications with either the shore or another user. However, due to the curvature of the earth, there is no direct line of sight, and therefore direct communications is not possible. Large boats deal with this by having a tall mast with an antenna at the top to improve their range. For many reasons, this is not an option for smaller boat. However, a drone provides the desired communications relay, essentially acting as a tall mast, by flying about 50 meters over the small boat. However, an untethered drone would quickly run out of power and be required to land, and therefore the communications relay is lost. Using systems and methods of the present disclosure, the drone can be tethered, and power and data can be provided over the tether, thereby enabling the drone to stay aloft for many hours or days. Thus, reliable, constant communication relay capability is provided to the small boat.

Example 2

In some cases, it is desired for the drone to fly high above a moving boat, but maintain a very low RF signature. In this scenario, the drone is equipped with sensitive equipment, such as a scientific sensor, that is very sensitive to RF interference. Therefore, it is desired that the data from the drone is passed to the moving boat via a wired connection, so that there is no RF transmission happening onboard. Using systems and methods of the present disclosure, a tethered system can be used to suit this need.

Example 3

Using systems and methods of the present disclosure, a tethered small unmanned aerial system (sUAS) can be configured for use in ground vehicles. The tethered sUAS includes a tethered sensor that can be mounted on a vehicle. The system is capable of rapid launch and recovery while on the move. The system can provide force protection, intelligence, surveillance, and reconnaissance (ISR) during extended duration operations.

The system is configured to not emit any radio frequency (RF) signals, and to not be reliant on any RF signals. The sensor is capable of operations with a variety of payloads (including EO/IR cameras, RF relays, radars). The system can be mounted to a vehicle. The system is capable of carrying a variety of payloads and sensors to facilitate a wide variety of applications, including ISR missions, Signals Intelligence, Precision Geo Locating, Tagging, Tracking, and Locating, Communications. The system is capable of a variety of optical combinations, including but not limited to: High Definition, Infrared, Thermal, and Short Wave Infrared. The optical system is capable of detecting a human-sized target.

The system is powered by the vehicle's charging system, and can utilize vehicle batteries to assist during high-power-draw segments of flight. The system is capable of connecting to a generator for standalone operations.

The system can interface with other systems on the vehicle and provide data based on the payload. This data can include, but is not limited to, slew to cue interface with the vehicle systems and crews, and act as a relay. Command and control (C2) and video connections are configured to not rely on external satellites or signals. The system can be developed with an open architecture so new payloads can be added as new technologies are developed.

The ability to operate UAS from moving platforms enable an entirely new class of UAS applications, including military operations, border security, law enforcement, search and rescue, communications, energy production, and commercial maritime operations. For professionals in these sectors, stopping their vehicle or vessel to operate a UAS may be dangerous, or jeopardize their mission. For maritime operations, stopping is not realistic because vessels at sea never completely stop moving. Therefore, the ability to operate a UAS on the move provides new applications that were previously unavailable or faced significant technical challenges.

On the move UAS technology expands aerial capabilities to vehicles and vessels, to provide real-time situational awareness at the point of need. This can enable an operational paradigm shift for maritime operations. In maritime operations, vessel-based UAS can provide organic on-demand real-time surveillance around ships, supporting missions for vessel security, maritime infrastructure inspection, and search & rescue. On land, vehicle-based UAS operating from moving patrol vehicles can support law enforcement and border patrol officers, while those officers remain safe and mobile in their vehicle. Land-based military convoys may also benefit from an autonomous vehicle-launched UAS system providing convoy support, even in GPS-denied environments.

Potential operational scenarios for the system are listed as follows, which is not exhaustive, but rather illustrative of the many operational use cases. The system may be configured to provide security for a site or border by streaming aerial video to an operator and automatically detecting and tracking specific objects of interest, such as human walkers. It can also be used to investigate a specific location from a safe distance. The system may be configured to provide convoy support by providing aerial ISR to vehicle convoys traveling in dangerous environments. Vehicle operators can receive direct visual advance warning of threats ahead of or approaching the convoy, organically, in real time. The system may be configured to act as a communication relay by providing a mobile aerial communication relay for the host vehicle and other data sources and consumers. Placing a communication node high above the vehicle radically extends the communication range and reduces interference from the ground and other RF sources. The system may be configured to provide counter-UAS capability by being deployed to detect enemy UAS approaching or in the vicinity of the host vehicle. The system may be configured to provide Counter-IED capability by being deployed to scan roads and terrain ahead of vehicle for signs of IEDs.

As an example, the systems and methods provided herein can be applied for convoy support applications. Vehicles and convoys traveling through dangerous environments are particularly vulnerable because of a short range of visibility. During military operations, convoys can face risks of being ambushed, with disastrous results. Having UAS operating organically from the vehicle(s) can provide aerial reconnaissance around those vehicles with much longer visibility ranges than are visible from within the cab. Live video from the UAS can be viewed from inside the cab of the vehicle so that threats can be spotted far in advance, and a safe standoff distance can be maintained. In addition, automated object detection and recognition software running on the UAS video feed can alert drivers of threats, even if they are not actively watching the video. The precision navigation system can perform autonomous launching, navigating, and landing of the UAS, which enables drivers and passengers to stay safely "buttoned up" inside their vehicle. The option to tether this mobile UAS sentry enables long flight durations, so that aerial support can be maintained for the entire trip. Furthermore, the tethered UAS can remain RF-quiet, so as not to give away the convoy location.

Figure 22:
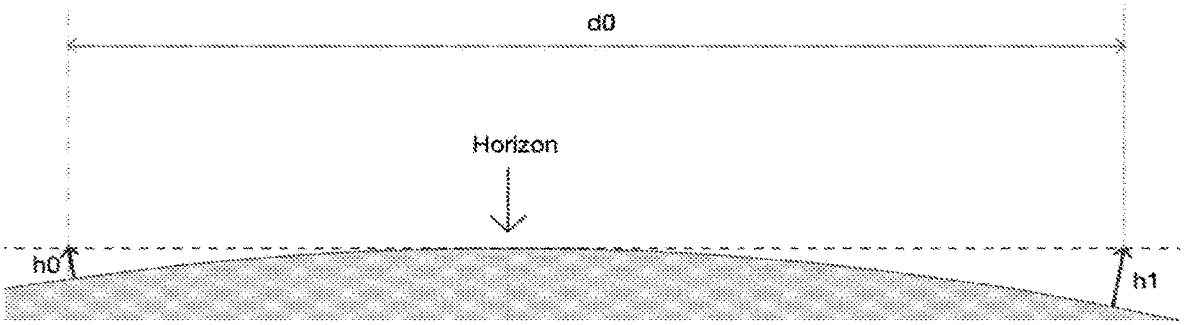
FIG. 22 illustrates a non-limiting example of how line-of-sight communication geometry over water improves dramatically with the use of communication antennas on tethered UAS, in accordance with some embodiments.

As another example, the systems and methods provided herein can be applied for communication relay applications. Tethered UAS are particularly valuable as communication relay stations. A high-powered radio and antenna can be placed on the UAS and lifted up hundreds of feet off the ground. This elevated aerial position establishes line-of-sight communication for many miles. This application of tethered UAS may be previously limited to stationary environments. Using the tethered mobility system described herein, these aerial communication relays can be deployed to vehicles moving through the desert, or for vessels operating offshore. The offshore environment is particularly well-suited for this technology. For example, as shown in FIG. 22, line-of-sight communication geometry over water improves dramatically with the use of communication antennas on tethered UAS. For example, a tethered UAS communication relay on a vessel may increase the vessel-side antenna height (hl) from 5-meters without the UAS, to 80-meters with the UAS. This would in turn increase the line-of-sight communication distance (d0) from 15 km to 40 km. Therefore, whereas a small vessel with a 4-meter mast height communicating with a radio on shore with an antenna that is mounted 5-meters off the ground may previously lose line-of-sight with the shore-side antenna at a range of 15 km offshore, that same vessel communicating with the same shore-side antenna can travel 40 km offshore while maintaining line-of-sight communications if it deployed its antenna on a tethered UAS flying 80 meters above the water.

Example 4

Using systems and methods of the present disclosure, an autonomous offshore asset inspection system is developed which includes a heterogeneous unmanned robotic system that enables maritime air and surface operations. The system is able to operate offshore and beyond visual line-of-sight (BVLOS). The system can be used remote monitoring and inspection of offshore energy assets.

USVs are excellent tools for persistent, long-range, and long-endurance remote operations. They can carry satellite communication links and solar recharging systems, to enable remote and autonomous operation. However, USVs with these capabilities may face challenges arising from being large, heavy, slow, difficult to deploy and recover, and limited to sea surface sensing, with no airborne capability. Vertical takeoff and landing (VTOL) UAS are agile and fast. They can be rapidly deployed for airborne data collection, can surveil large areas quickly, and can perform precision aerial maneuvers around structures. However, VTOL UAS may face challenges such as having short flight times, limited operational range, short-range communication links, and requiring frequent recharging or refueling.

The system may be assembled using a combination of hardware components (e.g., a tethered drone, a tether base station, a sensor payload) and software components (a precision UAV navigation software, and computational software).

The tethered drone is able to perform stable imaging in maritime environments while the tether base station is moving. The system is able to account for, and compensate for, the effects of vessel motion on the flight stability of the drone. As the vessel moves with waves, the tether base station also moves. The drone is attached to the tether base station through the tether cable, and the system is able to address any potential issues that the motion of the tether base during vessel motion may not be fully compensated by the tether tensioning system, and may pull the drone up and down.

The drone-tether system can be operated from an offshore vessel during significant swell conditions. The ability of the drone-tether system to compensate for heave is demonstrated. A fixed rigid body is used as a point of reference to measure the motion of the drone. For example, a second drone in free flight altitude-stabilized hover may be used as a fixed point of reference.

The system can be operated in a realistic environment, where the system images a stationary marine asset in significant sea state conditions. This demonstration is performed by imaging an oil rig in a marine environment. The drone-tether system is operated from a vessel. Measurements of the drone-tether system operation are collected, including oscillation of the drone imagery, measured in pixels (total displacement) and pixels/second (displacement rate). These measurements and the image data collected demonstrate the system's ability to resolve features as small as 1/32-inch at a 50-foot standoff distance. This translates to an angular pixel measurement on the camera of $5.2\times10^{-5}$ radians (the camera pixel individual field of view, or IFOV).

The system can be operating with a safe standoff distance of, for example, about 165 feet (50 meters). At this standoff distance, the equivalent ground sample distance (GSD) to meet the original requirement—given by the IFOV—is about 1/10". As a secondary measurement, the amount of oscillation of the drone imagery, measured in pixels (total displacement) and pixels/second (displacement rate), is observed and recorded. Nominal safe operating conditions for the system may be assessed based on environmental wind and sea conditions, such as a swell height of less than 1.5 m, a swell period of greater than 8 seconds, and a wind speed of less than 12 knots, or a combination thereof.

The system is deployed as follows. The tethered UAS and payload sensor are powered up and launched. The UAS launch is guided automatically using an optical navigation system. The UAS ascends to its nominal operational altitude above the vessel. The UAS performs optically-based station keeping to maintain a position above the vessel. Inspection using the system is performed as follows. Live video from the UAS is streamed down the tether and displayed on a laptop screen. The live video feed is used to search for features on the launch pier. When a feature of interest is identified, the sensor is zoomed in on that feature. An automatic image stabilization software helps stabilize the video around the feature of interest. The feature is visually inspected in the stabilized video, and still images of the feature are also captured and stored. The inspection process is repeated for a variety of features from several different viewing perspectives. The collected data is post-processed. The image quality and ground sample distance achieved are examined, and the test data are used to demonstrate the technical operation of the system within desired operating specifications.

All publications, patents, and patent applications mentioned in this specification are herein incorporated by reference to the same extent as if each individual publication, patent, or patent application was specifically and individually indicated to be incorporated by reference.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An unmanned aerial vehicle (UAV) system, the UAV system comprising:

a digital processing device comprising: at least one processor, an operating system configured to perform executable instructions, a memory, and a computer program including instructions executable by the digital processing device to create a tethered UAV application comprising:

a locational module configured to detect and track a target pattern to determine a relative three-dimensional position of a UAV to a mobile platform, based on the sensor data;

a navigation module configured to direct the UAV based on the relative three-dimensional position to maintain substantially accurate and constant vertical distance from the mobile platform throughout at least a portion of a flight of the UAV, even as the mobile platform moves up and down; and a spooling module configured to pay out or reel in a tether spool based at least on the relative three-dimensional position, wherein relative motion between the UAV and the mobile platform is reduced to thereby reduce heat generated and wear on the tether spool.

2. The UAV system of claim 1, wherein the tethered UAV application is repeatedly executed for a plurality of times.

3. The UAV system of claim 1, wherein the mobile platform comprises a boat, truck, car, van, sled, person, ship, aircraft, submarine, bicycle, motorcycle, crane, tractor, wind turbine, or a combination thereof.

4. The UAV system of claim 1, wherein the spooling module is further configured to pay out or reel in the tether spool based on at least one of: a measured weather data and a predicted weather data.

5. The UAV system of claim 1, wherein the tether is unspooled when the UAV takes off from the mobile platform.

6. The UAV system of claim 1, wherein at least one of the UAV, the mobile platform, and the tether comprises a tensiometer configured to measure a tether tension force.

7. The UAV system of claim 6, wherein the navigation module further directs at least one of the UAV propeller and the mobile platform based on the tether tension force.

8. The UAV system of claim 7, wherein the navigation module directs at least one of the UAV and the mobile platform to maintain the tether tension force below a predetermined threshold.

9. The UAV system of claim 1, wherein the navigation module directs at least one of the UAV and the mobile platform during a UAV takeoff, a UAV landing, a UAV translation, a UAV rotation, or any combination thereof.

10. The UAV system of claim 1, wherein the target pattern is a unique 2-dimensional pattern with high contrast.

11. The UAV system of claim 1, wherein the relative three-dimensional position comprises a vector, a distance, a position, an altitude, an attitude, a velocity, an acceleration, an orientation, or a combination thereof.

12. The UAV system of claim 1, wherein the sensor comprises one or more of: a vision sensor, a proximity sensor, and an inertial sensor, a gyroscope, a pressure sensor, a tachometer, an anemometer, a camera, an ultrasonic sensor, a light detection and ranging (LIDAR) sensor, and an inertial measurement unit.

13. The UAV system of claim 1, wherein at least one of the UAV and the mobile platform comprises a wireless communication unit configured to receive an instruction from a remote operator.

14. The UAV system of claim 13, wherein the instruction comprises at least one of the relative three-dimensional position, a mobile platform heading, a mobile platform velocity, a UAV heading, a UAV velocity, and a UAV altitude.

15. The UAV system of claim 1, wherein the mobile platform further comprises a tether spool.

16. The UAV system of claim 1, wherein the tether spool comprises a motor driven pinch roller configured to feed the tether in or out based on the relative three-dimensional position of the UAV to the mobile platform on which the motor driven pinch roller is attached.

17. The UAV system of claim 1, wherein the navigation module is further configured to direct the at least one of the UAV and the mobile platform based on the relative three-dimensional position, to maintain a substantially constant relative position of the UAV to the mobile platform.

18. The UAV system of claim 17, wherein the substantially constant relative position comprises a substantially constant relative X position of the UAV to the mobile platform, a substantially constant relative Y position of the UAV to the mobile platform, a substantially constant relative Z position of the UAV to the mobile platform, a substantially constant relative three-dimensional position of the UAV to the mobile platform, or a combination thereof.

19. The UAV system of claim 1, wherein the navigation module is further configured to direct the UAV to maintain a substantially constant altitude of the UAV.

20. The UAV system of claim 1, wherein the UAV comprises a sensor configured to measure the sensor data; wherein the mobile platform comprises the tether spool, wherein the target pattern comprises an information-encoded target pattern, and wherein a tether is configured to be attached to the UAV and to the mobile platform.

* * * * *